US012305591B2

(12) United States Patent
Woodward

(10) Patent No.: US 12,305,591 B2
(45) Date of Patent: May 20, 2025

(54) RECIPROCATING-PISTON ASSEMBLY, INTERNAL COMBUSTION ENGINE, AND RELATED METHODS

(71) Applicant: Transcend Energy Group, LLC, Sandpoint, ID (US)

(72) Inventor: Jon Woodward, Mapleton, UT (US)

(73) Assignee: Transcend Energy Group, LLC, Sandpoint, ID (US)

( * ) Notice: Subject to any disclaimer, the term of this patent is extended or adjusted under 35 U.S.C. 154(b) by 0 days.

(21) Appl. No.: 18/608,095

(22) Filed: Mar. 18, 2024

(65) Prior Publication Data

US 2024/0218842 A1     Jul. 4, 2024

Related U.S. Application Data

(63) Continuation of application No. 18/052,273, filed on Nov. 3, 2022, now Pat. No. 11,933,245, which is a
(Continued)

(51) Int. Cl.
*F02B 41/04* (2006.01)
*F02F 3/28* (2006.01)
(Continued)

(52) U.S. Cl.
CPC ............... *F02F 3/28* (2013.01); *F16C 7/06* (2013.01); *F16J 1/18* (2013.01); *F16C 2226/62* (2013.01); *F16C 2360/22* (2013.01)

(58) Field of Classification Search
CPC .......... F16J 7/00; F16J 1/14; F16J 1/16; F02F 3/0069; F02F 3/0076
(Continued)

(56) References Cited

U.S. PATENT DOCUMENTS

| 1,379,115 A | 5/1921 | Mallory |
| 1,430,491 A | 9/1922 | Joseph et al. |

(Continued)

FOREIGN PATENT DOCUMENTS

| BR | 9500241 A | 10/1995 |
| CN | 201310408 | 9/2009 |

(Continued)

OTHER PUBLICATIONS

Chinese First Office Action and Search Report for Application No. 201980047834.9 dated Jan. 5, 2022, 7 pages.
(Continued)

*Primary Examiner* — Long T Tran
*Assistant Examiner* — James J Kim
(74) *Attorney, Agent, or Firm* — TraskBritt

(57) ABSTRACT

A piston assembly includes a piston head for reciprocating back and forth within a cylinder of an engine, an upper rod coupled to the piston head at one longitudinal end of the upper rod and fixed relative to the piston head, and a lower rod rotatably coupled to an opposite longitudinal end of the upper rod, the lower rod configured to pivot about the opposite longitudinal end of the upper rod. The lower rod is configured to couple to a crankshaft at a longitudinal end of the lower rod opposite the upper rod. Methods of forming a piston assembly and engines incorporating such piston assemblies are also disclosed.

19 Claims, 29 Drawing Sheets

Related U.S. Application Data continuation of application No. 17/151,030, filed on Jan. 15, 2021, now Pat. No. 11,506,141, which is a continuation-in-part of application No. PCT/US2019/042053, filed on Jul. 16, 2019.

(60) Provisional application No. 62/699,113, filed on Jul. 17, 2018, provisional application No. 63/115,483, filed on Nov. 18, 2020, provisional application No. 63/134,097, filed on Jan. 5, 2021, provisional application No. 62/858,744, filed on Jun. 7, 2019.

(51) Int. Cl.
*F16C 7/06* (2006.01)
*F16J 1/18* (2006.01)

(58) Field of Classification Search
USPC ..................................................... 123/197.2
See application file for complete search history.

(56) References Cited

U.S. PATENT DOCUMENTS

| | | | |
|---|---|---|---|
| 1,569,582 A | 1/1926 | Scott | |
| 2,369,792 A | 2/1945 | Notturno | |
| 2,853,989 A * | 9/1958 | Teegen | F16J 1/14 |
| | | | 74/579 E |
| 3,034,362 A * | 5/1962 | Caddell | F02B 75/044 |
| | | | 74/36 |
| 3,859,976 A * | 1/1975 | McWhorter | F02B 41/04 |
| | | | 74/579 E |
| 4,089,235 A | 5/1978 | McWhorter | |
| 4,203,406 A | 5/1980 | Smith | |
| 4,567,866 A * | 2/1986 | Schubert | F02B 41/04 |
| | | | 123/197.1 |
| 5,479,894 A | 1/1996 | Noltemeyer et al. | |
| 5,682,853 A * | 11/1997 | Hull | F16J 1/20 |
| | | | 123/197.3 |
| 6,789,313 B2 | 9/2004 | Hendricks | |
| 8,220,434 B2 | 7/2012 | Mouradov | |
| 8,286,606 B2 | 10/2012 | Breidenbach et al. | |
| 8,601,994 B2 | 12/2013 | Mukouhara et al. | |
| 9,334,797 B2 | 5/2016 | Velazquez | |
| 10,151,269 B2 | 12/2018 | Brown et al. | |
| 10,578,149 B2 | 3/2020 | Fukuma et al. | |
| 11,125,269 B1 | 9/2021 | Velazquez | |
| 2010/0065009 A1 | 3/2010 | Mukouhara et al. | |
| 2010/0282206 A1 | 11/2010 | Mouradov | |

FOREIGN PATENT DOCUMENTS

| | | |
|---|---|---|
| EP | 1165976 A1 | 1/2002 |
| JP | 2003-194172 A | 7/2003 |
| JP | 2005-106085 A | 4/2005 |
| JP | 2009-041523 A | 2/2009 |
| JP | 2010-071122 | 5/2011 |
| JP | 2012-505350 A | 3/2012 |
| JP | 5008627 | 8/2012 |
| JP | 5388249 | 1/2014 |
| JP | 2015-218731 A | 12/2015 |
| JP | 2016-211680 | 12/2016 |
| KR | 10-2002-0054385 A | 7/2002 |
| KR | 10-0412555 B1 | 7/2002 |
| WO | 01/55606 A1 | 8/2001 |
| WO | 2017/013727 A1 | 1/2017 |

OTHER PUBLICATIONS

European Search Report and Search Opinion Received for EP Application No. 19838402.6, dated on Mar. 9, 2022, 7 pages.
International Preliminary Report on Patentability, for International Application No. PCT/US2019/042053, dated Jan. 19, 2021, 8 pages.
Japanese Final Office Action for Japanese Application No. 2021-526206 dated Nov. 15, 2022, 6 pages.
Japanese Office Action for Application No. 2021-526206 dated Apr. 11, 2022, 4 pages.
Japanese Office Action for Application No. 2021-526206 dated Apr. 13, 2023, 5 pages.
Korean Office Action for Application No. 10-2021-7004555 dated May 2, 2023, 4 pages.
European Examination Report for Application No. 19838402.6 dated Nov. 24, 2023, 4 pages.

\* cited by examiner

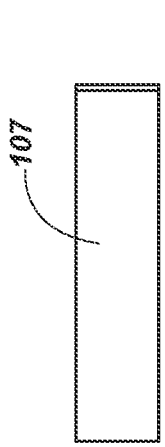
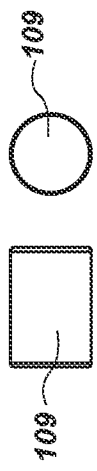
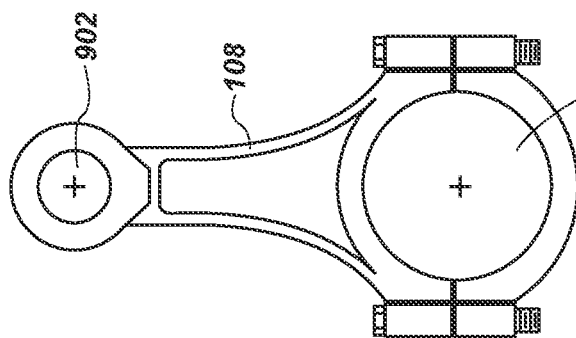
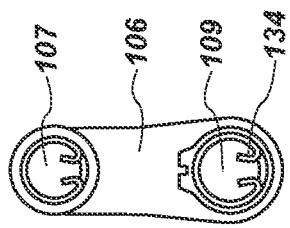
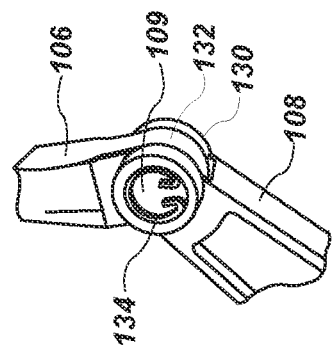
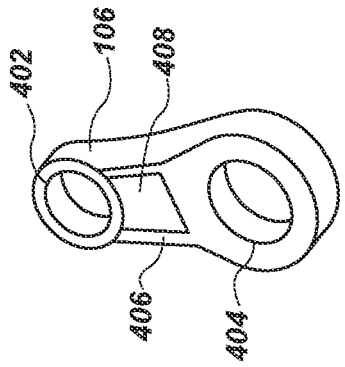
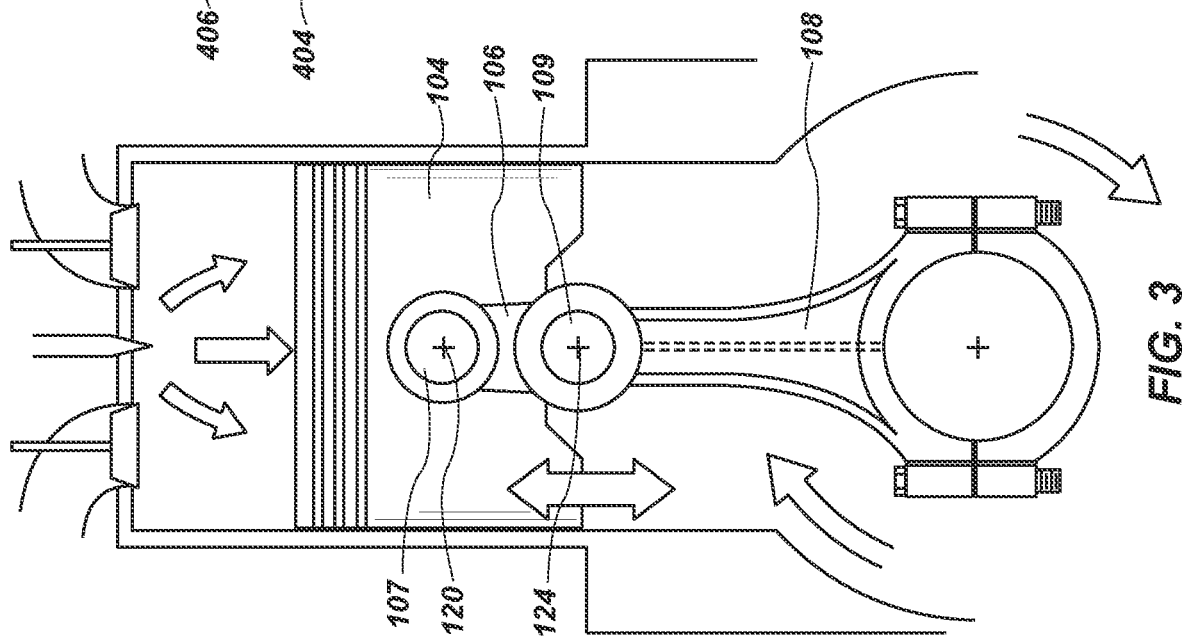

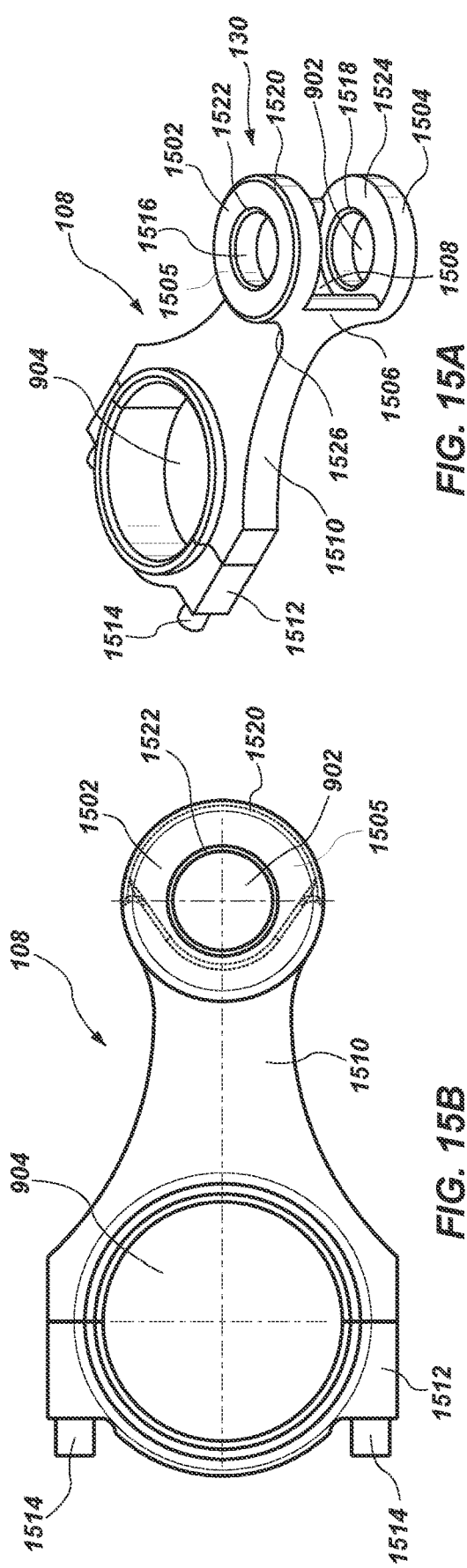
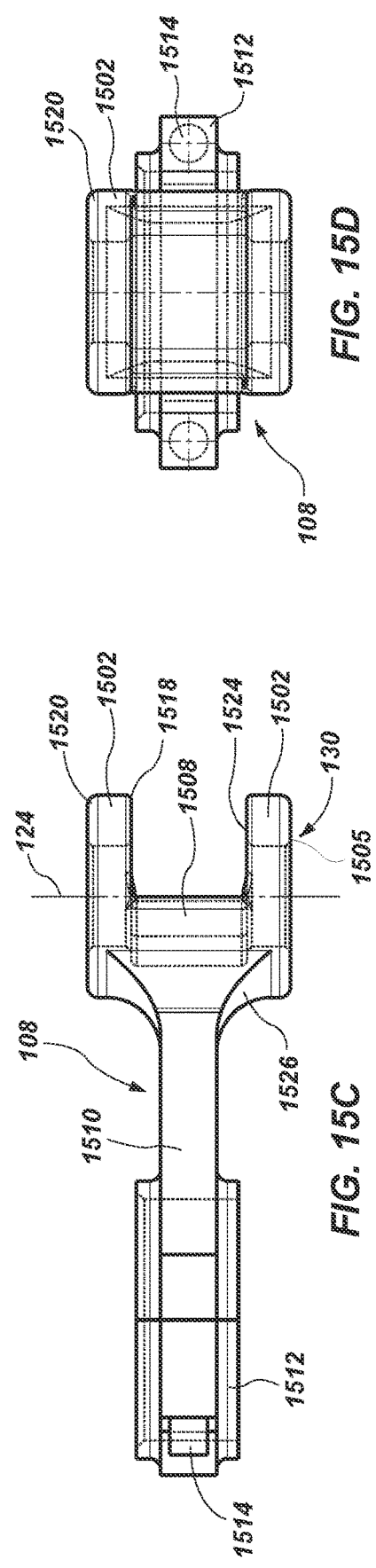
FIG. 15A
FIG. 15D
FIG. 15B
FIG. 15C

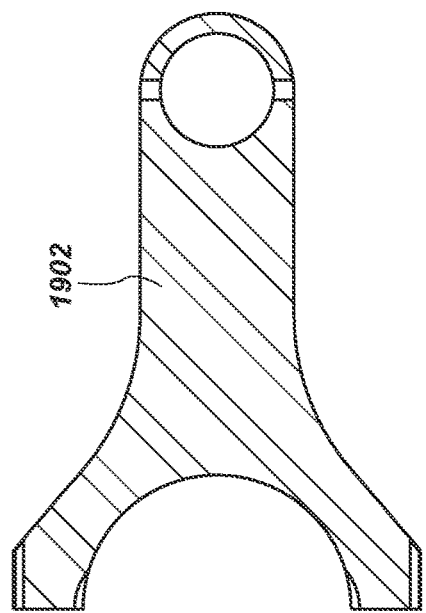
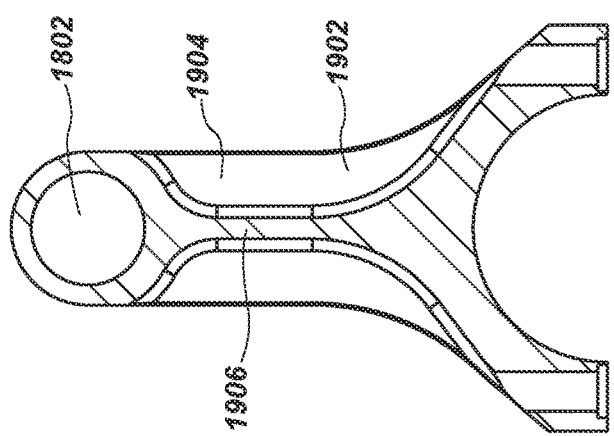
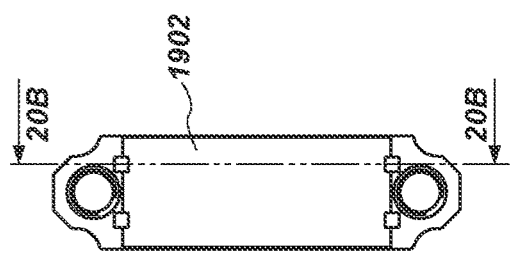
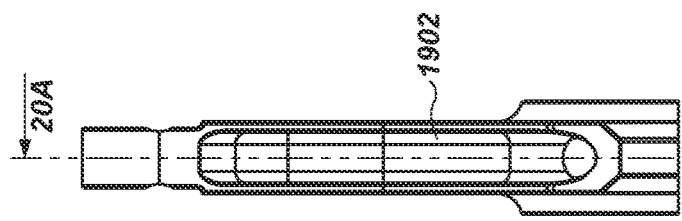
FIG. 20A
FIG. 20B
FIG. 20C
FIG. 20D

RECIPROCATING-PISTON ASSEMBLY, INTERNAL COMBUSTION ENGINE, AND RELATED METHODS

CROSS-REFERENCE TO RELATED APPLICATION

This application is a continuation of U.S. patent application Ser. No. 18/052,273, filed Nov. 3, 2022, now U.S. Pat. No. 11,933,245 issued on Mar. 19, 2024, which is a continuation of U.S. patent application Ser. No. 17/151,030, filed Jan. 15, 2021, now U.S. Pat. No. 11,506,141, issued Nov. 22, 2022, which is a continuation-in-part application of International Patent Application No. PCT/US2019/042053, filed on Jul. 16, 2019, which claims the benefit of U.S. Provisional Patent Application Ser. No. 62/699,113, filed Jul. 17, 2018, and U.S. Provisional Patent Application Ser. No. 62/858,744, filed Jun. 7, 2019. This application also claims the benefit under 35 U.S.C. § 119 (e) of U.S. Provisional Patent Application Ser. No. 63/115,483, filed on Nov. 18, 2020, and U.S. Provisional Patent Application Ser. No. 63/134,097, filed on Jan. 5, 2021, the disclosure of each of which is hereby incorporated herein in its entirety by this reference.

TECHNICAL FIELD

The present disclosure relates to an internal combustion engine and, more specifically, to a piston assembly for use in an engine and for connecting a piston head to a crankshaft of the engine.

BACKGROUND

A conventional internal combustion engine of the type found in most vehicles today includes a plurality of pistons that are, respectively, movably mounted in a plurality of cylinders formed in an engine block. Each of the pistons is connected to a piston rod at a first end of the piston rod, and the piston rod is coupled to a crankshaft at a second end of the piston rod. Furthermore, when spark plugs within the engine block fire to ignite a fuel mixture, the pistons are driven downward to turn the crankshaft, which ultimately drives the entire vehicle. In a typical engine, a single connecting rod is used and connected with a respective first end to the corresponding piston and a respective second end to a corresponding portion of the crankshaft. The connecting points between the two ends of each connecting rod and the corresponding piston and corresponding crankshaft are disposed at the ends of the longitudinal center axis of the respective connecting rod.

BRIEF SUMMARY

Some embodiments of the present disclosure may include a piston assembly. The piston assembly may include a piston head for reciprocating within a cylinder of an engine; an upper rod coupled to the piston head at one longitudinal end of the upper rod and fixed relative to the piston head; and a lower rod rotatably coupled to an opposite longitudinal end of the upper rod. The lower rod may be configured to pivot about the opposite longitudinal end of the upper rod. The lower rod may also be configured to couple to a crankshaft at a longitudinal end of the lower rod opposite the upper rod.

Other embodiments of the present disclosure may include an engine, including one or more cylinders, a crankshaft, and one or more piston assemblies. Each piston assembly may be disposed within a respective cylinder. Each piston assembly may include a piston head sized and shaped to reciprocate within the cylinder of the engine; an upper rod coupled to the piston head at one longitudinal end of the upper rod and fixed relative to the piston head; and a lower rod rotatably coupled to an opposite longitudinal end of the upper rod, the lower rod configured to pivot about the opposite longitudinal end of the upper rod. The lower rod may be rotatably coupled to the crankshaft at a longitudinal end of the lower rod opposite the upper rod.

Further embodiments of the present disclosure may include a method of forming a piston assembly. The method may include coupling an upper rod to a piston head at a first longitudinal end of the upper rod. The method may further include fixing a position the upper rod relative to the piston head. The method may also include rotatably coupling a lower rod to a second longitudinal end of the upper rod. The method may further include rotatably coupling the lower to a crankshaft of an engine.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein:

FIG. 3 is another side view of the piston assembly within an engine according to one or more embodiments of the present disclosure;

FIG. 4 is a perspective view of an upper rod of a piston assembly according to one or more embodiments of the present disclosure;

FIG. 5 is a side view of the upper rod of FIG. 4;

FIG. 6 is a side view of a gudgeon pin of the piston assembly according to one or more embodiments of the present disclosure;

FIG. 7 is a side and front view of a connector pin according to one or more embodiments of the present disclosure;

FIG. 8 is a perspective view of an upper rod, gudgeon pin assembly, and lower rod of the piston assembly according to one or more embodiments of the present disclosure;

FIG. 9 is a side view of a lower rod of the piston assembly according to one or more embodiments of the present disclosure;

FIGS. 14A-14D, 15A-15D, and 16A-16D show various additional drawings of the upper rod, lower rod, and piston head of the piston assembly according to one or more embodiments of the present disclosure;

FIGS. 20A-20D show various additional views of the upper portion of the lower rod of FIGS. 18A and 18B according to one or more embodiments of the present disclosure;

DETAILED DESCRIPTION

Figure 2B:
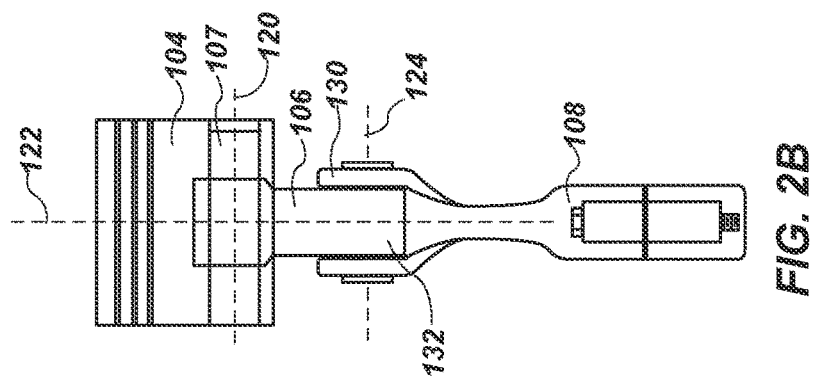
FIGS. 2A and 2B show various views of the piston assembly of FIG. 1.

The illustrations presented herein are not actual views of any internal combustion engine system, piston assembly, or any component thereof, but are merely idealized representations, which are employed to describe embodiments of the present disclosure.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "top," "bottom," "upper," "lower," etc., is used for clarity and convenience in understanding the disclosure and accompanying drawings, and does not connote or depend on any specific preference or order, except where the context clearly indicates otherwise. For example, these terms may refer to orientations of elements of a piston assembly or an engine in conventional orientations. Furthermore, these terms may refer to orientations of elements of a piston assembly or an engine as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

Figure 2A:
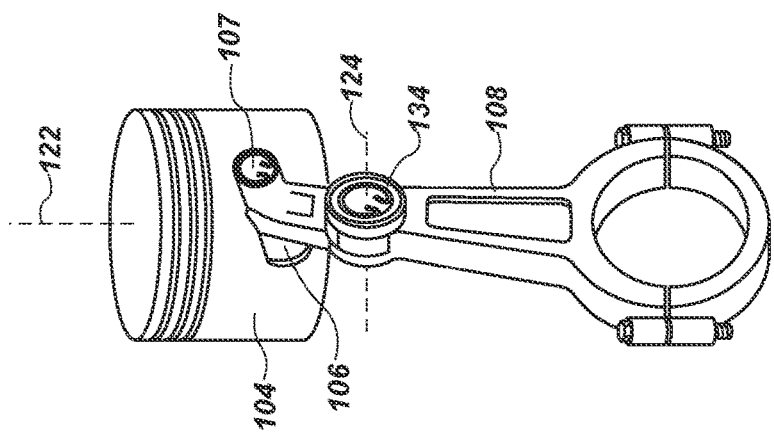
Figure 1:
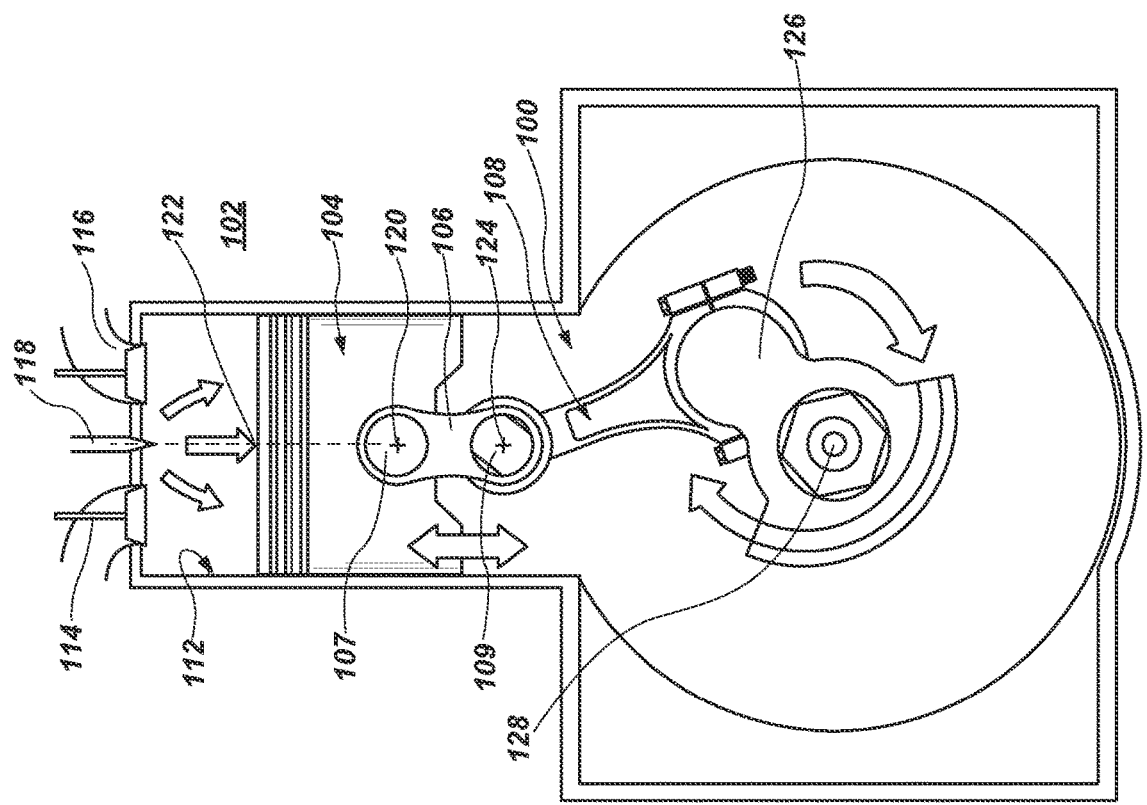
FIG. 1 is a schematic depiction of a piston assembly within an engine according to one or more embodiments of the present disclosure.

FIG. 1 shows a schematic representation of a piston assembly 100 disposed within an engine 102. FIGS. 2A and 2B include a schematic perspective view and a schematic side view of the piston assembly 100 of FIG. 1. Referring to FIGS. 1-2B together, the piston assembly 100 may include a piston head 104, an upper rod 106, a gudgeon pin assembly 107 (e.g., two or more pin locks, a needle sleeve bearing, and gudgeon pin (e.g., wrist pin)), a lower rod 108, and a connector pin assembly 109. The engine 102 may include a cylinder 112, one or more valves 114 and exhaust ports 116 (e.g., an intake valve and port and exhaust valve and port), and a fuel injector 118. The one or more valves 114 and exhaust ports 116 of the engine 102 may be oriented in conventional manners.

The piston head 104 of the piston assembly 100 may be disposed within the cylinder 112 of the engine 102 and may be configured to reciprocate back and forth (e.g., up and down as depicted in FIG. 1) during use. The upper rod 106 may be coupled to the piston head 104 via the gudgeon pin assembly 107 at a first longitudinal end of the upper rod 106 and may be coupled to the lower rod 108 at a second opposite longitudinal end of the upper rod 106. In some embodiments, the upper rod 106 may be coupled to the piston head 104 proximate or at a centroid of the piston head 104. In one or more embodiments, the upper rod 106 may be coupled to the piston head 104 at a point that is centered between an upper surface and lower surface of the piston head 104 and intersecting a center longitudinal axis 122 of the piston head 104. In one or more embodiments, a longitudinal axis 120 of the gudgeon pin assembly 107 may extend in a direction perpendicular to the longitudinal axis 122 of the piston head 104 and may intersect the longitudinal axis 122 of the piston head 104. The upper rod 106 may be fixed relative to the piston head 104. For instance, the upper rod 106 may not rotate and/or translate relative to the piston head 104 during use. The upper rod 106 is described in greater detail below in regard to FIGS. 10A and 10B.

The upper rod 106 may extend in an axial direction (e.g., in a direction parallel to the longitudinal axis 122 of the piston head 104) from the piston head 104 to a region below the piston head 104 (e.g., below the piston head 104 as depicted in FIGS. 1-2B). For instance, a longitudinal length of the upper rod 106 may be greater than a distance from a point at which the upper rod 106 is coupled to the piston head 104 to a lowermost surface of the piston head 104. Furthermore, the longitudinal axis of the upper rod 106 may be parallel to the longitudinal axis 122 of the piston head 104. In view of the foregoing, a lower longitudinal end of the upper rod 106 may be oriented beneath the piston head 104 when the upper rod 106 is coupled to the piston head 104.

As noted above, the upper rod 106 may be coupled to the lower rod 108 on a longitudinal end opposite the piston head 104 (i.e., the lower longitudinal end of the upper rod 106). In some embodiments, the upper rod 106 may be coupled to the lower rod 108 via the connector pin assembly 109. In one or more embodiments, the connector pin assembly 109 may include any gudgeon and/or wrist pin and associated assembly known in the art. Referring to FIG. 2B, in some embodiments, the lower rod 108 may include a forked portion 130, and the upper rod 106 may include a connector portion 132 sized and shaped to fit within the forked portion 130 of the lower rod 108. The connector pin assembly 109 may extend through the forked portion 130 of the lower rod 108 and the connector portion 132 of the upper rod 106. Referring to FIGS. 1-2B together again, in some embodiments, a longitudinal axis 124 of the connector pin assembly 109 may be parallel to the longitudinal axis 120 of the gudgeon pin assembly 107 and may intersect the longitudinal axis 122 of the piston head 104. In alternative embodiments, the longitudinal axis 124 of the connector pin assembly 109 may be perpendicular to the longitudinal axis 120 of the gudgeon pin assembly 107.

The lower rod 108 may be rotatable relative to the upper rod 106. For instance, the lower rod 108 may be configured to pivot about the connector pin assembly 109 and the upper rod 106. For example, the connector pin assembly 109 may provide a bearing about which the lower rod 108 may pivot as the piston assembly 100 cycles through strokes (described below). In some embodiments, a ratio of a longitudinal length (i.e., center-to-center length) of the upper rod 106 and a longitudinal length (i.e., center-to-center length) of the lower rod 108 may be within a range of about 0.25 and about 0.65. For instance, a ratio of a longitudinal length of the upper rod 106 and a longitudinal length of the lower rod 108 may be within a range of about 0.33 and about 0.57. For example, a ratio of a longitudinal length of the upper rod 106 and a longitudinal length of the lower rod 108 may be about 0.457.

Additionally, in some embodiments, a ratio of a longitudinal length (i.e., center-to-center length) of the upper rod 106 and a distance from a connection point of the upper rod 106 to the piston head 104 (i.e., the center longitudinal axis of the gudgeon pin assembly 107) to a center longitudinal axis 128 of the crankshaft 126 when the piston head 104 is at bottom dead center may be within a range of about 0.45 and about 0.85. For instance, a ratio of a longitudinal length of the upper rod 106 and a distance from a connection point of the upper rod 106 to the piston head 104 to a center longitudinal axis 128 of the crankshaft 126 when the piston head 104 is at bottom dead center may be within a range of about 0.60 and about 0.75. For example, a ratio of a longitudinal length of the upper rod 106 and a distance from a connection point of the upper rod 106 to the piston head 104 to a center longitudinal axis 128 of the crankshaft 126 when the piston head 104 is at bottom dead center may be about 0.68.

The lower rod 108 may be coupled to a crankshaft 126 at a longitudinal end of the lower rod 108 opposite the upper rod 106. The crankshaft 126 may include a conventional crankshaft. For instance, the crankshaft 126 may translate reciprocating motion of the piston head 104 into rotational motion. As is known in the art, a crankshaft includes multiple "crank throws" or "crankpins" and multiple bearing surfaces (e.g., rod journals, connecting rod journals, etc.) having axes offset from the center longitudinal axis 128 of the crankshaft 126. The lower rod 108 may be coupled to a respective bearing surface of the crankshaft 126. Additionally, the lower rod 108 may be coupled to the crankshaft 126 via any conventional bearings. Furthermore, as will be appreciated by one of ordinary skill in the art, an axis of rotation 128 (i.e., center longitudinal axis) of the crankshaft 126 may be parallel to the longitudinal axis 124 of the connector pin assembly 109.

For purposes of describing the operation of the piston assembly 100, hour positions of a typical clock face are referred to herein (e.g., 12 o'clock, 3 o'clock, etc.) as positions of the lower longitudinal end of the lower rod 108 about the axis of rotation 128 of the crankshaft 126. For example, the foregoing positions may refer to a center point of the lower longitudinal end of the lower rod 108 and its position relative to the axis of rotation 128 of the crankshaft 126 as depicted in FIG. 1, wherein the piston head 104 associated with the lower rod 108 is at top dead center in the 12 o'clock position and at bottom dead center at the 6 o'clock position regardless of an orientation of the associated engine and/or cylinder.

As is described in further detail below, the upper rod 106 of the piston assembly 100 provides a lower connection point for the lower rod 108 to connect to the piston head 104 in comparison to conventional connector rods know in the art. In particular, the upper rod 106 enables the lower rod 108 to pivot about a point that is lower relative to the piston head 104 than typical points about which conventional connector rods pivot. By having a lower point of connection (i.e., a lower pivot point), the lower rod 108 may be shorter than conventional connector rods and may reduce a lever length of the lower rod 108. As a result, less force may be required to move the piston head 104 from the 12 o'clock position to the 6 o'clock position and/or to initiate movement of the piston head 104 from the 12 o'clock position; additionally, less force may be required to move the piston head 104 from the 6 o'clock position to the 12 o'clock position and/or to initiate movement of the piston head 104 from the 6 o'clock position. In other words, the orientation of the crankshaft 126 relative to the connection point of the lower rod 108 may provide the crankshaft 126 with better leverage (i.e., a higher amount mechanical advantage) over a translation of the piston head 104 within the cylinder 112 of the engine 102 in comparison to conventional piston assemblies.

By reducing the force required to move the piston assembly 100 from 12 o'clock position to the 6 o'clock position and the 6 o'clock position to the 12 o'clock position, the piston assembly 100 of the present disclosure may reduce a tendency of the piston assembly 100 to remain at the 12 o'clock and 6 o'clock positions. For instance, reducing the force required to move the piston assembly 100 from 12 o'clock position to the 6 o'clock position and from the 6 o'clock position to the 12 o'clock position may reduce a tendency of the piston assembly 100 to remain in a top dead center position or at a bottom dead center position. In some embodiments, the crankshaft 126 may experience an at least substantially consistent resistance to rotation throughout a full rotation of the crankshaft 126 unlike conventional piston assemblies, which have increased resistance at least around the 12 o'clock and 6 o'clock positions. In particular, during rotation, the crankshaft 126 may not experience peaks in resistance to rotation due to the piston assembly 100 unlike peaks experienced by crankshafts utilizing conventional piston assemblies.

In some embodiments, the engine 102 and piston assembly 100 may include a four-stroke engine. For instance, during use, the piston assembly 100 may complete four separate strokes while turning the crankshaft 126. In other words, the engine 102 and piston assembly 100 may cycle through a typical four-stroke cycle.

The piston assembly 100 may begin a four-stroke cycle with an intake stroke (e.g., an induction or suction stroke). The intake stroke begins with the piston head 104 positioned at top dead center and ends with the piston head 104 positioned at bottom dead center, as is known in the art. During the intake stroke, an intake valve (e.g., valve 114) opens (due to a distributor cam lobe of a distributor cam, as is known in the art), and as the piston head 104 moves downward within the cylinder 112, the piston head 104 pulls air mixture into the cylinder 112 by generating a vacuum pressure within the cylinder 112 via the piston head's 104 downward motion. Additionally, the fuel injector 118 injects fuel into the air to form an air-fuel mixture. As noted above, the piston assembly 100 of the present disclosure may reduce a force required to move the piston head 104 from the 12 o'clock position to the 6 o'clock position, and as a result, a portion of the energy required to perform the intake stroke may be saved (e.g., energy from other piston assemblies rotating the crankshaft 126 during power (i.e., combustion) strokes of the other piston assemblies). As will be appreciated by one of ordinary skill in the art, reducing an amount of energy required to perform intake strokes will result in more energy being available for other operations of the engine 102 (e.g., operating a vehicle with the engine 102). Accordingly, the piston assembly 100 of the present disclosure may provide a more efficient engine in comparison to conventional piston assemblies.

Subsequent to the intake stroke, the piston assembly 100 commences a compression stroke. The compression stroke begins with the piston head 104 positioned at bottom dead center and ends with the piston head 104 positioned at top dead center. During the compression stroke, the piston head 104 compresses the air-fuel mixture in preparation for ignition during the power stroke (described below). Furthermore, during the compression stroke, the intake and exhaust valves (e.g., valves 114) are closed. As described above, the piston assembly 100 of the present disclosure reduces a force required to move the piston head 104 from the 6 o'clock position to the 12 o'clock position, and as a result, a portion of the energy required during the compression stroke may be saved. As will be appreciated by one of ordinary skill in the art, reducing an amount of energy required to perform compression strokes will result in more energy being available for other operations of the engine 102.

Upon compressing the air-fuel mixture and arriving at top dead center, the piston assembly 100 may commence the power (i.e., combustion or ignition) stroke. When the piston head 104 is proximate to top dead center, the air-fuel mixture is ignited by an initiator (e.g., spark plug, glow plug, etc.) or heat generated by high compression (e.g., diesel engines). Igniting the air-fuel mixture causes an explosion that forcibly causes the piston head 104 to return to bottom dead center. As is known in the art, the power stroke produces mechanical work from the engine 102 to rotate the crankshaft 126. For instance, the power stroke may produce mechanical work via conventional methods involving piston assemblies and crankshafts.

As described above, the piston assembly 100 of the present disclosure reduces a force required to move the piston head 104 from the 6 o'clock position or from the 12 o'clock position. As a result, the piston assembly of the present disclosure enables the air-fuel mixture to be ignited closer to or at the 12 o'clock position in comparison to conventional piston assemblies. For instance, conventional piston assemblies typically have ignition positions between the 10 o'clock and 12 o'clock positions in order to provide the necessary force to rotate through the 12 o'clock position. Furthermore, as will be understood by one of ordinary skill in the art, having the air-fuel mixture be ignited closer to or at the 12 o'clock position (and not significantly earlier) allows for greater dwell time (e.g., a greater dwell angle (i.e., a greater length of time—expressed in distributor cam rotational degrees—that breakers are closed and the initiator is being charged with electricity)) of the distributor cam rotation. By increasing a dwell time, the piston assembly 100 of the present disclosure may reduce abruptness of the cam lobes of a distributor cam and may enable intake valves and exhaust valves (e.g., valves 114) to be open longer during intake and exhaust strokes of the piston assembly 100.

Moreover, having the air-fuel mixture be ignited closer to or at the 12 o'clock position (and not significantly earlier) may reduce an amount of engine knock (i.e., a hammer effect) exhibited by engines implementing the piston assembly 100 of the present disclosure in comparison to conventional engines. Reducing engine knock may increase an overall efficiency of the engines implementing the piston assembly 100 and may lead to increased overall power while maintaining cylinder size and piston number. Additionally, in some embodiments, the piston assembly 100 of the present disclosure may dissipate heat more efficiently from the 3 o'clock position to the 6 o'clock position during the power stroke. For instance, in some embodiments, in comparison to conventional piston assemblies, the crankshaft may be rotated by the piston assembly 100 past the 3:00 pm position (and/or the 6:00 pm position) more quickly than conventional piston assemblies. Accordingly, heat generated by burning the air-fuel mixture has less time to be absorbed by the cylinder and engine block. A result, more of the heat is expelled through the exhaust valve 114 and exhaust port 116 during the exhaust stroke (described below). In some embodiments, dissipating heat more efficiently may lead to reduced nitrogen oxide emissions.

Upon reaching bottom dead center, the piston assembly 100 initiates an exhaust stroke. During the exhaust stroke, the piston head 104 of the piston assembly 100 once again returns from bottom dead center to top dead center while an exhaust valve (e.g., valve 114) is open. The action of the piston head 104 moving from bottom dead center to top dead center expels spent air-fuel mixture past the exhaust valve 114 and through an exhaust port 116. Furthermore, upon reaching top dead center, the piston assembly 100 may repeat the above-described four strokes.

In view of the foregoing, because the piston assembly 100 of the present disclosure reduces rotation resistance experienced by the crankshaft 126, more energy from the power strokes of the piston assemblies 100 of the engine 102 can be maintained (e.g., carried) through the 12 o'clock and 6 o'clock positions, thus, reducing required energy for performing subsequent strokes. Accordingly, the piston assembly 100 of the present disclosure may provide a more efficient engine in comparison to conventional piston assemblies.

FIG. 3 is another schematic side view of a piston assembly 100 disposed within a cylinder 112 of an engine 102 according to one or more embodiments of the present disclosure. The crankshaft 126 is removed in FIG. 3 to better show components of the piston assembly 100. The lower rod 108 may be coupled to the upper rod 106 through the connector pin assembly 109. The connector pin assembly 109 may be configured to enable the lower rod 108 to pivot relative to the upper rod 106 about the longitudinal axis 124 of the connector pin assembly 109. The upper rod 106 may be coupled to the piston head 104 through the gudgeon pin assembly 107. The upper rod 106 may be configured to transmit motion of the crankshaft 126 input into the lower rod 108 to the piston head 104 such that rotation of the crankshaft 126 results in a linear motion of the piston head 104 along the longitudinal axis 122 of the piston head 104. The upper rod 106 and lower rod 108 may substantially align with the longitudinal axis 122 of the piston head 104, as illustrated in FIG. 3, when the piston assembly 100 is in the top dead center position and/or the bottom dead center position (e.g., the 12 o'clock and 6 o'clock positions) before a direction of the piston head 104 is reversed.

FIG. 4 is a perspective view of the upper rod 106 according to one or more embodiments of the present disclosure. The upper rod 106 may include an upper aperture 402 and a lower aperture 404 formed in the ends of the upper rod 106. The upper aperture 402 may be sized and shaped to receive the gudgeon pin assembly 107. In some embodiments, the gudgeon pin assembly 107 may be coupled to the upper rod 106 through an interference fit (e.g., mechanical interference, press fit, etc.). For example, the upper aperture 402 may be substantially circular having a diameter substantially similar to or even slightly smaller than the gudgeon pin assembly 107. In some embodiments, the upper aperture 402 may have a diameter slightly larger than the gudgeon pin assembly 107 and may be configured to enable the gudgeon pin assembly 107 to rotate relative to the upper rod 106 and/or provide lubrication to the gudgeon pin assembly 107. For example, the upper aperture 402 may have a diameter between about 0.0002 in. (5.1 μm) and about 0.0030 in. (76.2 μm) greater than a corresponding diameter of the gudgeon pin assembly 107, such as between about 0.0005 in. (12.7 μm) and about 0.0025 in. (63.5 μm) greater, or between about 0.0008 in. (20.3 μm) and about 0.0022 in (55.9 μm) greater than the diameter of the gudgeon pin assembly 107.

The lower aperture 404 may be configured to receive the connector pin assembly 109. In some embodiments, the connector pin assembly 109 may be coupled to the upper rod 106 through an interference fit. For example, the lower aperture 404 may be substantially circular having a diameter substantially similar to or even slightly smaller than the connector pin assembly 109. In some embodiments, the lower aperture 404 may slightly larger than the connector pin assembly 109 and be configured to enable the connector pin assembly 109 to rotate relative to the upper rod 106 and/or provide lubrication to the connector pin assembly 109. For example, the lower aperture 404 may have a diameter between about 0.0002 in. (5.1 μm) and about 0.0030 in. (76.2 μm) greater than a corresponding diameter of the connector pin assembly 109, such as between about 0.0005 in. (12.7 μm) and about 0.0025 in. (63.5 μm) greater, or between about 0.0008 in. (20.3 μm) and about 0.0022 in (55.9 μm) greater than the diameter of the connector pin assembly 109.

In some embodiments, the upper rod 106 may include ridges 406 defining one or more recesses 408 in the upper rod 106 between the upper aperture 402 and the lower aperture 404. The ridges 406 may be configured to substantially prevent the upper rod 106 from deforming under the loads transmitted to and from the piston head 104 through the upper rod 106. For instance, the ridge 406 may be sized and shaped to add structural integrity to the upper rod 106. The one or more recesses 408 defined by the ridges 406 may enable the upper rod 106 to be formed using less material that may reduce a mass of the upper rod 106, which may result in a reduction of mass for the piston assembly 100 and the rotating mass of the associated engine 102.

FIG. 5 is a side view of the upper rod 106 of FIG. 4. The gudgeon pin assembly 107 may be received in the upper aperture 402. In some embodiments, the gudgeon pin assembly may be secured to the upper rod 106 with a pin lock 134. In some embodiments, the pin lock 134 may be positioned in the piston head 104 (FIG. 3) at opposite ends of the gudgeon pin assembly 107 sandwiching the gudgeon pin assembly 107 between the pin locks 134. The pin lock 134 may include a snap ring (e.g., CIRCLIPS®, C-clips, E-clips, etc.), a wire clip, spiral locks (e.g., spirolocks, etc.), a pin button, a set screw, a cinch-bolt, roll pin, etc.

The connector pin assembly 109 may be received in the lower aperture 404. In some embodiments, the connector pin assembly 109 may be secured to the upper rod 106 with a pin lock 134. In some embodiments, the pin lock 134 may be positioned in the lower rod 108 (FIG. 3) at opposite ends of the connector pin assembly 109 sandwiching the connector pin assembly 109 between the pin locks 134. In some embodiments, the connector pin assembly 109 may extend beyond an outer surface of the joint between the lower rod 108 and the upper rod 106 and the pin locks 134 may be located on the connector pin assembly 109 at opposing ends of the connector pin assembly sandwiching the upper rod 106 and the lower rod 108 between the pin locks 134. The pin lock 134 may include a snap ring (e.g., CIRCLIPS®, C-clips, E-clips, etc.), a wire clip, spiral, a pin button, a set screw, a cinch-bolt, roll pin, etc.

FIG. 6 is a side view of the gudgeon pin of a gudgeon pin assembly 107 according to one or more embodiments of the present disclosure. Referring to FIGS. 4-6 together, the gudgeon pin assembly 107 may be configured to extend through the upper aperture 402 of the upper rod 106 and into the piston head 104. The gudgeon pin assembly 107 may secure the upper rod 106 to the piston head 104. In some embodiments, the gudgeon pin assembly 107 may be configured in a semi-floating configuration wherein the gudgeon pin assembly 107 enables the piston head 104 to rotate relative to the gudgeon pin assembly 107 and is rotationally secured to the upper rod 106. For example, the gudgeon pin assembly 107 may have an interference fit in the upper aperture 402 of the upper rod 106. In some embodiments, the gudgeon pin assembly 107 may be configured in a full-floating configuration wherein the gudgeon pin assembly 107 is configured to enable the upper rod 106 and the piston head 104 to rotate relative to the gudgeon pin assembly 107. The gudgeon pin assembly 107 may have a length sufficient to extend into the piston head 104 on opposite sides of the upper rod 106.

FIG. 7A is a side view of connector pin of a connector pin assembly 109 and FIG. 7B is an end view of the connector pin assembly 109 according to one or more embodiments of the present disclosure. Referring to FIGS. 4-7B together, the connector pin assembly 109 may be configured to extend through the lower aperture 404 of the upper rod 106 and into the lower rod 108. The connector pin assembly 109 may secure the upper rod 106 to the lower rod 108 forming a joint (e.g., pivot point) between the upper rod 106 and the lower rod 108. In some embodiments, the connector pin assembly 109 may be configured in a semi-floating configuration. For example, the connector pin assembly 109 may be fixed to the upper rod 106 or the lower rod 108 through a connection such as a press fit, while having a clearance fitting with the opposite lower rod 108 or upper rod 106. The clearance fit may enable the associated upper rod 106 or lower rod 108 to rotate relative to the connector pin assembly 109. In some embodiments, the connector pin assembly 109 may be configured in a full-floating configuration with a clearance fit between the connector pin assembly 109 and the upper rod 106 and the lower rod 108, such that both the upper rod 106 and the lower rod 108 may rotate relative to the connector pin assembly 109.

FIG. 8 is a perspective view of the lower rod 108 coupled to the upper rod 106 via the connector pin assembly 109. The connector portion 132 of the upper rod 106 may be located within the forked portion 130 of the lower rod 108. The connector pin assembly 109 may extend through the forked portion 130 of the lower rod 108 and the connector portion 132 of the upper rod 106. In some embodiments, the connector pin assembly 109 may be secured with one or more pin locks 134. For example, pin locks 134 may be inserted into the forked portion 130 of the lower rod 108 on opposite ends of the connector pin assembly 109 sandwiching the connector portion 132 between the pin locks 134. The connector pin assembly 109 may be configured to enable the lower rod 108 to pivot relative to the upper rod 106 at the joint between the upper rod 106 and the lower rod 108 about the longitudinal axis 124 of the connector pin assembly 109.

FIG. 9 is a side view of the lower rod 108 of the piston assembly 100. In one or more embodiments, the lower rod 108 may include an upper aperture 902 formed near a first longitudinal end of the lower rod 108 and a lower aperture 904 formed near a second longitudinal end of the lower rod 108. The upper aperture 902 of the lower rod 108 may be sized and shaped to have the connector pin assembly 109 extend therethrough. The lower aperture 904 of the lower rod 108 may be sized and shaped to have a bearing portion of the crankshaft 126 extend therethrough.

Figure 10B:
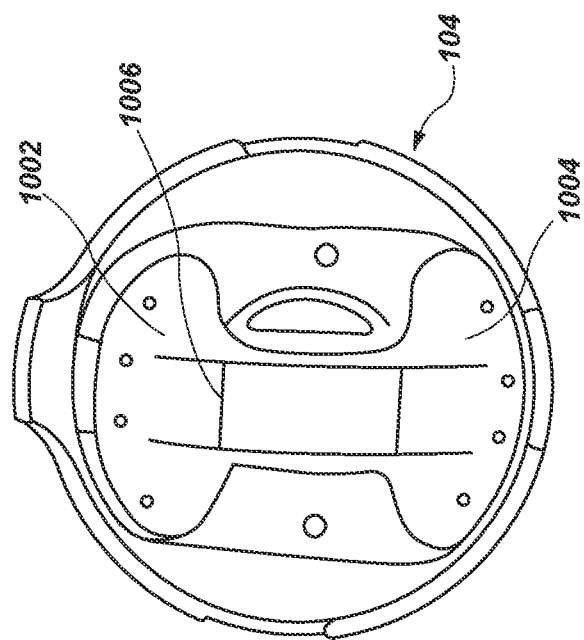
FIG. 10B is a bottom view of the piston head of FIG. 10A.
Figure 10A:
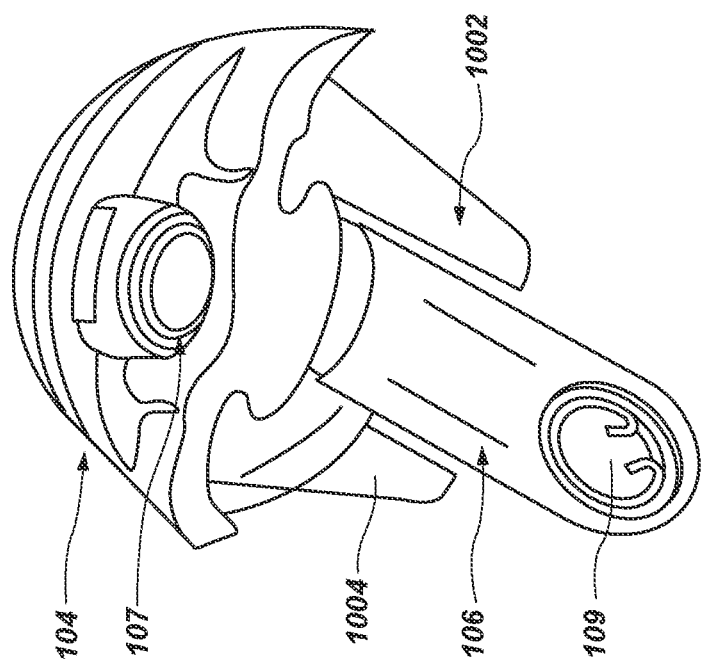
FIG. 10A is a perspective view of a piston head and upper rod of the piston assembly according to one or more embodiments of the present disclosure.

FIG. 10A is a bottom perspective view of a piston head 104 having an upper rod 106 coupled thereto according to one or more embodiments of the present disclosure. FIG. 10B is a bottom view of the piston head 104 of FIG. 10A. Referring to FIGS. 10A and 10B together, the upper rod 106 is removed from FIG. 10B to better show the structure of the piston head 104. As shown in FIGS. 10A and 10B, in some embodiments, the piston head 104 may include one or more gussets 1002, 1004 for securing and fixing a position of the upper rod 106 relative to the piston head 104. For instance, the one or more gussets may extend downward (downward as depicted in FIG. 10A) and may define an upper rod receiving aperture 1006 in the piston head 104. The upper rod receiving aperture 1006 may be sized and shaped to receive the upper rod 106 and to substantially hold a position of the upper rod 106 fixed relative to the piston head 104 such that the upper rod 106 does not significantly move relative to the piston head 104 during piston strokes. For instance, the one or more gussets 1002, 1004 and upper rod receiving aperture 1006 may hold the position of upper rod 106 fixed relative to the piston head 104 via mechanical interference. In some embodiments, the one or more gussets 1002, 1004 may be integral (e.g., may form an integral body) with the piston head 104. In additional embodiments, the one or more gussets 1002, 1004 may include distinct members from the piston head 104 and may be attached (e.g., welded) to the piston head 104.

Figure 11:
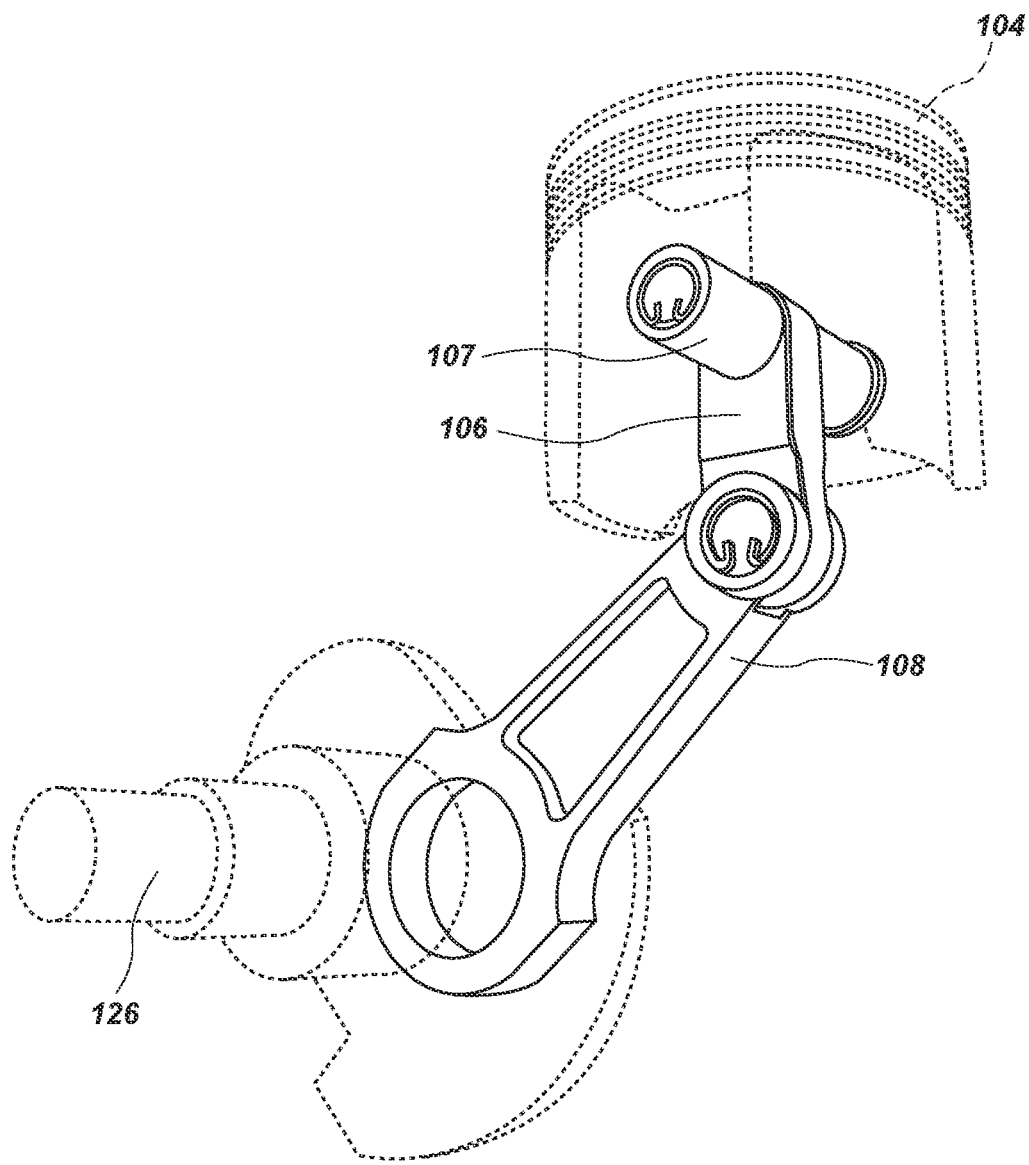
FIGS. 11-13 include various views of the piston assembly and crankshaft according to one or more embodiments of the present disclosure.
Figure 12:
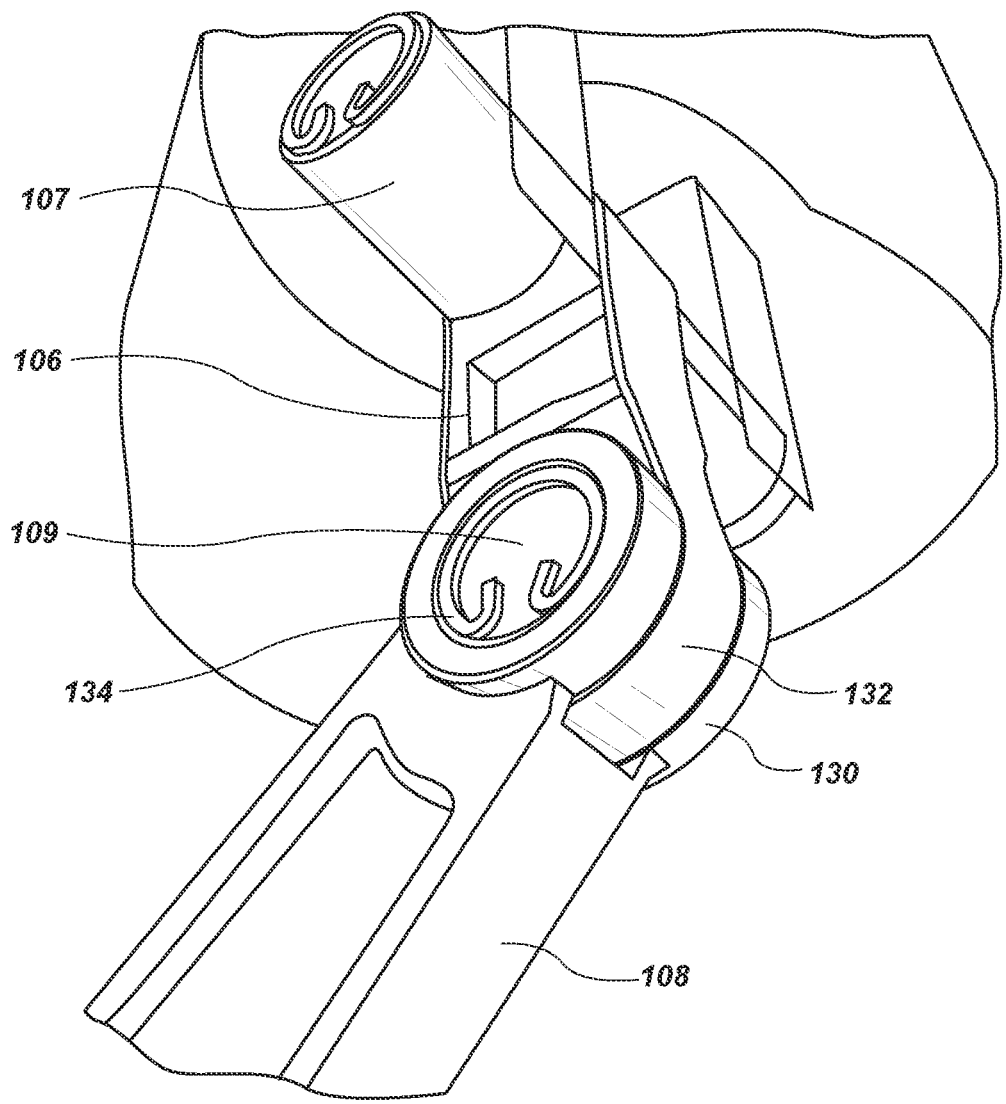
Figure 13:
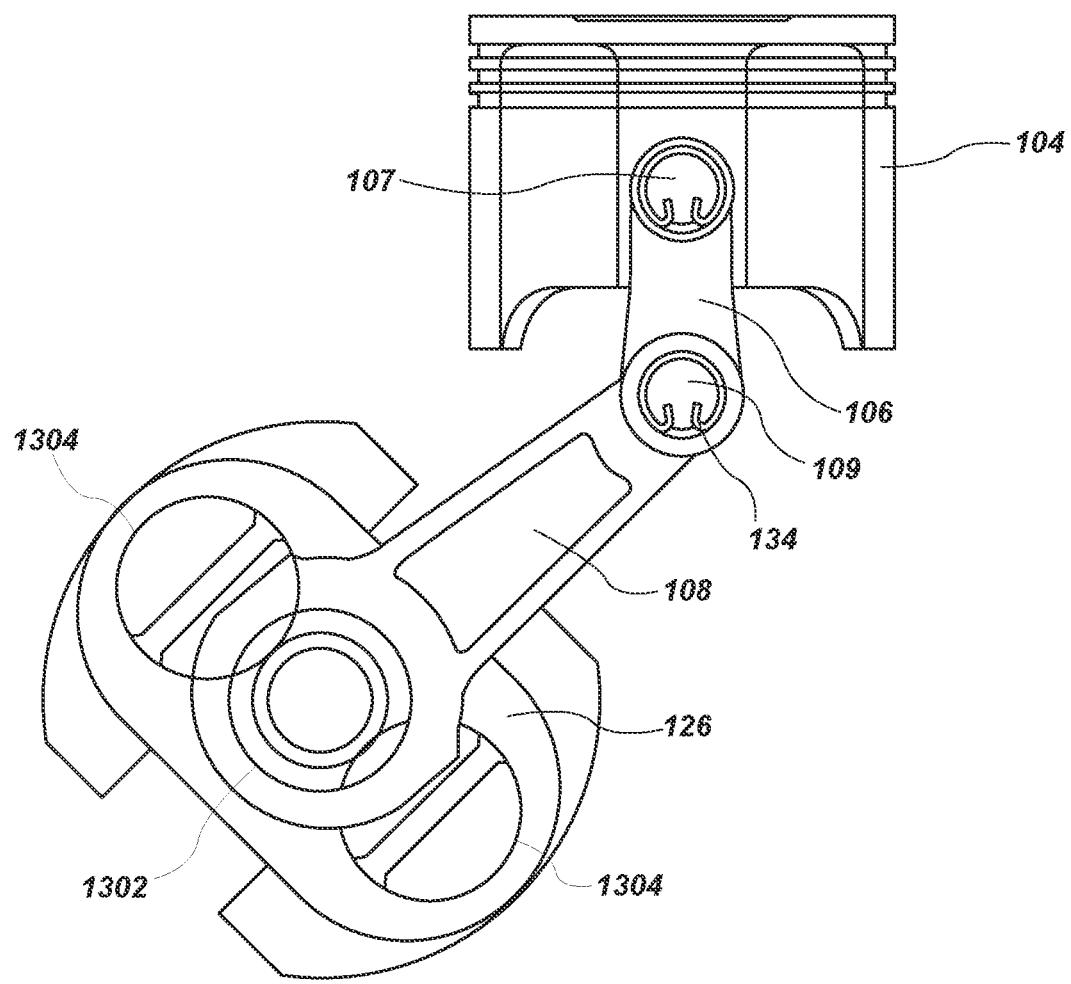

FIGS. 11-13 show additional perspective views of the piston head 104 and crankshaft 126 according to one or more embodiments of the present disclosure. Referring to FIGS. 11-13 together, the lower rod 108 may be coupled to an outer journal 1304 of the crankshaft 126. The crankshaft 126 may rotate about a longitudinal axis of the crankshaft 126. The outer journal 1304 of the crankshaft 126 may travel around the longitudinal axis of the crankshaft 126. The lower rod 108 may travel with the outer journal 1304 of the crankshaft 126 about the longitudinal axis of the crankshaft 126.

The connector pin assembly 109 between the upper rod 106 and the lower rod 108 may change an angle between the lower rod 108 and the crankshaft 126 relative to an engine with similar stroke and a connecting rod connecting directly between the piston head 104 and the crankshaft 126 at the same respective positions. For example, the angle between the lower rod 108 and the crankshaft 126 may change more rapidly after the piston head 104 reaches top dead center or bottom dead center. The rapid change in the angle between the lower rod 108 and the crankshaft 126 may enable the lower rod 108 to achieve a more advantageous angle (e.g., an angle providing more leverage) earlier during a stroke. An advantageous angle, relative to conventional piston assemblies, between the lower rod 108 and the crankshaft 126 may be an angle such that the force being transmitted through the lower rod 108 is substantially tangential to the circular motion of the outer journal 1304 of the crankshaft. As the angle between the lower rod 108 and the crankshaft 126 approaches the advantageous angle, less of the force being transmitted by the lower rod 108 may be wasted. Furthermore, wasting less force results in a more efficient transmission of power.

In some embodiments, the more rapidly changing angle between the lower rod 108 and the crankshaft 126 may enable dimensions of the engine 102 to be reduced with less clearance required for the connecting rod assembly. In some embodiments, the more rapidly changing angle between the lower rod 108 and the crankshaft 126 may enable the crankshaft 126 to be configured to impart a wider range of movement to the piston head 104 (e.g., a longer stroke) before additional clearance is required inside the motor to accommodate the movement of the connecting rod assembly. In particular, at the 3 o'clock and 9 o'clock positions (e.g., mid-stroke), a conventional connecting rod may extend in a substantially straight diagonal line from the outer journal 1304 to the piston head 104 requiring more clearance between the connecting rod and internal engine structures than a connecting rod assembly according to embodiments of the present disclosure.

FIG. 13 illustrates an alternative embodiment where the lower rod 108 may be coupled to a central journal 1302 of the crankshaft 126. For example, the engine may include one or more control cylinders where the piston head 104 and connecting rod assembly are maintained stationary. For example, a variable compression engine may include a control cylinder to which one or more piston assemblies are coupled to provide a common reference when varying the travel (e.g., stroke) of the piston assemblies in the active cylinders.

Figure 14A:
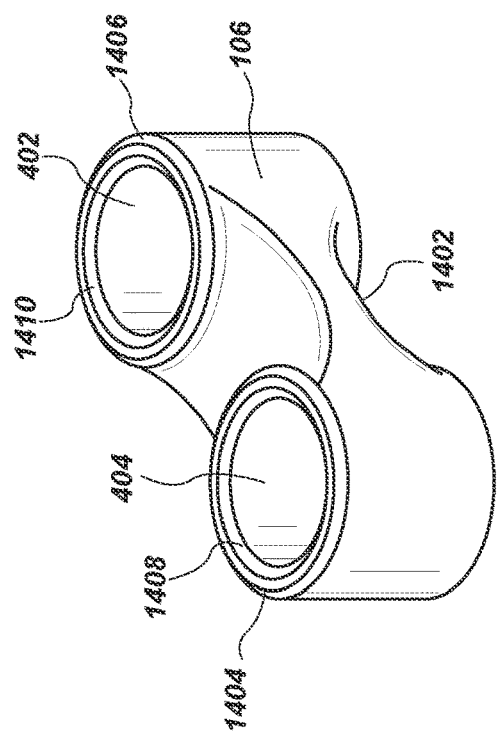
Figure 14C:
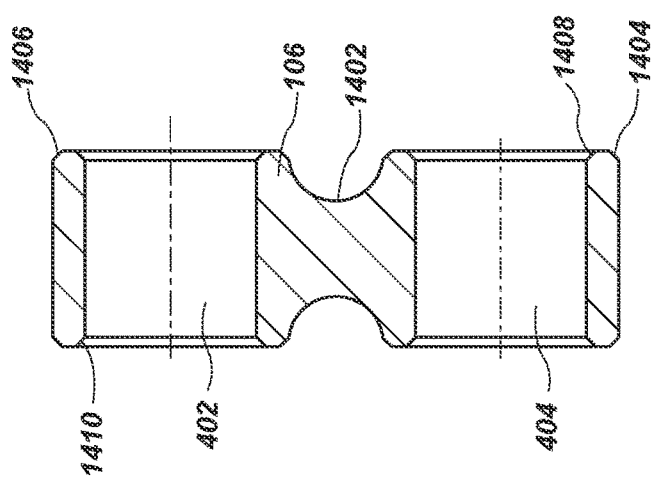
Figure 14B:
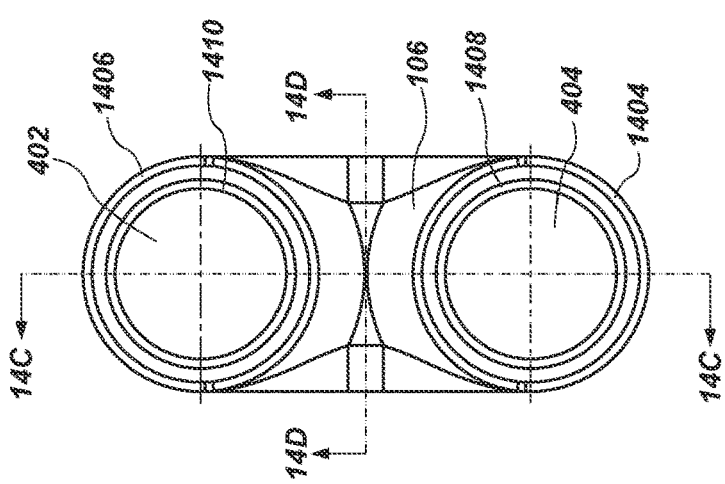
Figure 14D:
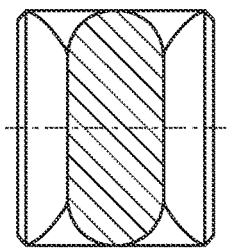

FIG. 14A illustrates a perspective view of the upper rod 106. FIG. 14B illustrates a side view of the upper rod 106. FIG. 14C illustrates a cross-sectional view of the upper rod. FIG. 14D illustrates a cross-sectional view of the upper rod. Referring to FIGS. 14A-14D, the upper rod 106 may include a stem 1402 connecting the upper aperture 402 and the lower aperture 404. In some embodiments, the stem 1402 may have at least one dimension that is substantially the same as the dimensions of the upper rod 106 at the ends of the upper rod 106. For example, the stem 1402 may have a width that is substantially the same as a diameter of the ends of the upper rod 106. In some embodiments, the stem 1402 may have another dimension that varies along the length of the stem 1402. For example, a surface of the stem 1402 may be recessed in a central portion of the stem 1402. The recess may enable the stem 1402 to be constructed with fewer materials, reducing a mass of the upper rod 106. The dimensions of the stem 1402 may be configured such that more material is present in regions of the stem 1402 where higher amounts of stress may be present, while reducing the amount of material in lower stress regions of the upper rod 106.

The ends of the upper rod 106 may include material surrounding and defining the upper aperture 402 and the lower aperture 404. The material surrounding the upper aperture 402 may include an outer chamfer 1406 along an outer edge of the material and an inner chamfer 1410 along an inner edge defining the upper aperture 402. The material surrounding the lower aperture 404 may include an outer chamfer 1404 along an outer edge of the material and an inner chamfer 1408 along an inner edge defining the lower aperture 404. The chamfers 1404, 1406, 1408, and 1410 may reduce stress risers in the material and/or reduce friction between the upper rod 106 and other components such as the gudgeon pin assembly 107, the connector pin assembly 109, the piston head 104, and the lower rod 108.

In some embodiments, the upper aperture 402 and the lower aperture 404 may be offset from one another. For example, the upper aperture 402 and the lower aperture 404 may be offset in a direction substantially parallel to the axes of the gudgeon pin assembly 107 and connector pin assembly 109. In another example, the upper aperture 402 and the lower aperture 404 may be offset from each other in a direction substantially transverse to the axes of the gudgeon pin assembly 107 and connector pin assembly 109. The direction and/or magnitude of the offset may be configured to reduce one or more of rotational balancing, engine harmonics, and/or side loads on the piston.

FIG. 15A illustrates a perspective view of the lower rod 108. FIG. 15B illustrates a front view of the lower rod 108. FIG. 15C illustrates a side view of the lower rod 108. FIG. 15D illustrates a bottom view of the lower rod 108. Referring to FIGS. 15A-15D, in some embodiments, the lower rod 108 may be formed in at least two parts. The lower rod 108 may include a rod portion 1510 and a bearing cap 1512. The bearing cap 1512 and rod portion 1510 may define the lower aperture 904. The bearing cap 1512 may be configured to be removed to enable a journal of the crankshaft 126 to be inserted into the portion of the lower aperture 904 defined by the rod portion 1510. The bearing cap 1512 may be coupled to the rod portion 1510 after the journal of the crankshaft 126 is inserted into the lower aperture 904 of the rod portion 1510, enclosing the journal of the crankshaft 126 in the lower aperture 904 of the lower rod 108. The bearing cap 1512 may be coupled to the rod portion 1510 through a hardware connection 1514, such as studs, nuts, bolts, screws, etc.

The lower rod 108 may include a forked portion 130. The forked portion 130 may include at least two annular sections 1502 defining the upper aperture 902 and a base section 1508 separating the at least two annular sections 1502 defining an opening between the at least two annular sections configured to receive the connector portion 132 of the upper rod 106. The base section 1508 may include a curved surface having a complementary shape to the end surface of the upper rod 106 such that the lower rod 108 may pivot freely when coupled to the upper rod 106. In some embodiments, the base section 1508 and/or the at least two annular sections 1502 may include a limiting element configured to limit a rotation of the lower rod 108 relative to the upper rod 106. For example, the limiting element may include a stop, a gear, a set of interlocking teeth, etc., configured to substantially prevent the lower rod 108 and the upper rod 106 from reaching a critical angle, such as a locking angle or an angle that will generate excessive side loads on the piston causing the piston skirt to contact the cylinder wall.

The at least two annular sections 1502 may include chamfered edges 1518, 1520, and 1522. For example, the at least two annular sections may include a chamfered edge 1518 between an inner surface 1516 of the upper aperture 902 and an inner surface 1524 of the associated annular section 1502. The at least two annular sections 1502 may also include a chamfered edge 1520 between a radial surface 1504 and a face surface 1505 of the associated annular section 1502. The at least two annular sections 1502 may further include a chamfered edge 1522 between inner surface 1516 of the upper aperture 902 and the face surface 1505 of the associated annular section 1502.

The lower rod 108 may include connecting structures 1506, 1526 coupling the forked portion 130 to the rod portion 1510 of the lower rod 108. A side connecting structure 1506 may form a rounded surface that is substantially tangential with both the rod portion 1510 of the lower rod 108 and the at least two annular sections 1502. The side connecting structure 1506 may operatively couple the at least two annular sections 1502 to each other and operatively couple the at least two annular sections 1502 to the rod portion 1510 of the lower rod 108. A face connecting structure 1526 may couple the at least two annular sections 1502 to a respective face of the rod portion 1510 of the lower rod 108. For example, the face connecting structure 1526 may extend between the face of the rod portion 1510 of the lower rod 108 to the radial surface 1504 of the respective annular section 1502. In some embodiments, the face connecting structure 1526 may include a rounded surface that may be substantially tangential to both the face of the rod portion 1510 of the lower rod 108 and the radial surface 1504 of the respective annular section 1502.

Figure 16A:
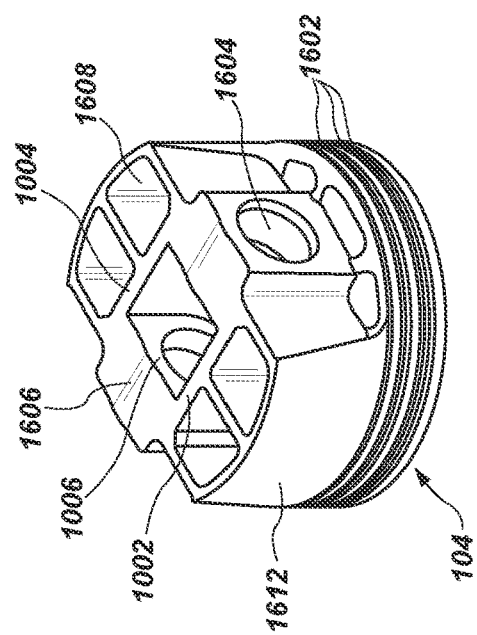
Figure 16C:
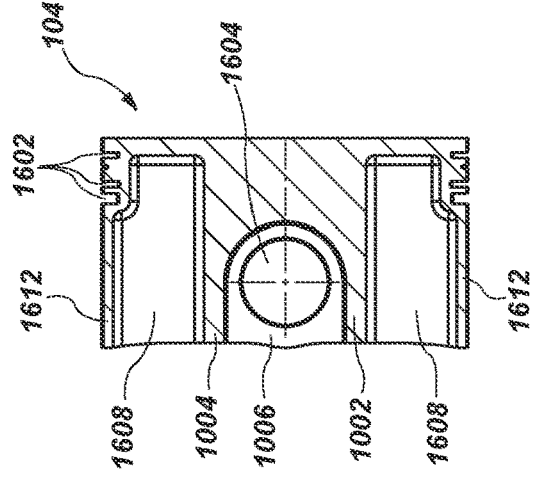
Figure 16B:
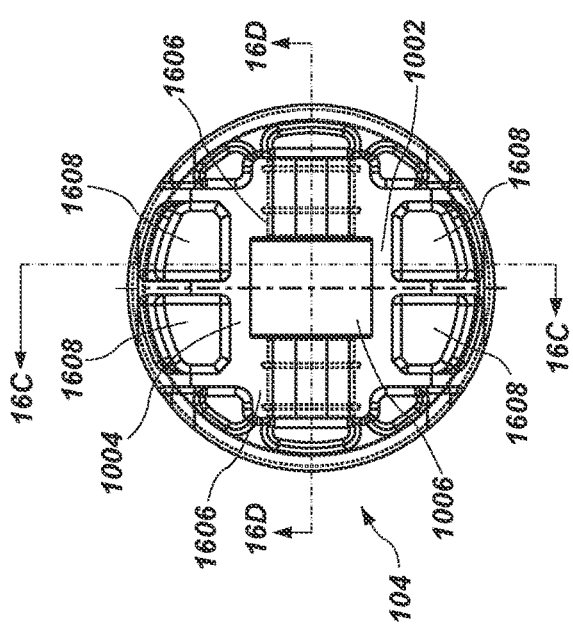
Figure 16D:
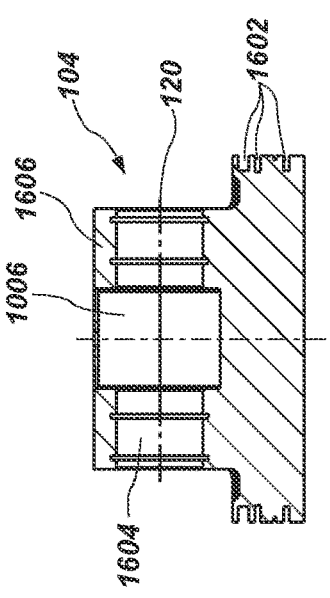

FIG. 16A shows a perspective view of the piston head 104 according to one or more embodiments of the present disclosure. FIG. 16B shows a bottom view of the piston head 104. FIG. 16C shows a cross-sectional view of the piston head 104. FIG. 16D shows a cross-sectional view of the piston head 104. Referring to FIGS. 16A-16B, the upper rod receiving aperture 1006 of the piston head 104 may be defined by the gussets 1002, 1004 and the pin support structure 1606. In some embodiments, the upper rod receiving aperture 1006 may be configured to limit rotation of the upper rod 106 relative to the piston head 104. For example, in some embodiments, the upper rod receiving aperture 1006 may be configured to limit the how far the upper rod 106 may rotate relative to the piston head 104, such as between about −15° and about 15°, between about −10° and about 10°, or between about −5° and about 5°. In other embodiments, the upper rod receiving aperture 1006 may be configured to substantially prevent rotation of the upper rod 106 relative to the piston head 104.

The piston head 104 may include one or more annular grooves 1602 (e.g., ring grooves). The annular grooves 1602 may be configured to receive piston rings (e.g., compression rings, sealing rings, oil rings, etc.). The piston rings may be configured to form a seal between the piston head 104 and a respective cylinder wall in the engine 102 and reduce the surface area of the piston assembly 100 in contact with the cylinder wall of the engine 102. The piston head 104 may also include skirts 1612. The skirts 1612 may extend from a top portion of the piston head 104 below the annular grooves 1602 at substantially the same diameter of the top portion of the piston head 104. The skirts 1612 may be radially positioned about 90° from the pin support structure 1606 and/or substantially radially aligned with the gussets 1002, 1004. The skirts 1612 may be configured to substantially maintain an orientation of the piston head 104 relative to the respective cylinder in the engine 102 when side load forces are transmitted to the piston head 104 through the connecting rod assembly. For example, the skirts 1612 may be configured to only contact the cylinder wall if the piston head 104 begins to rotate about the gudgeon pin assembly 107 relative to the cylinder and substantially prevent the rotation. The skirts 1612 and the gussets 1002, 1004 may define one or more cavities 1608 in the piston head 104. The one or more cavities 1608 may reduce a material mass of the piston head 104 and/or enable the piston head 104 to dissipate heat.

The pin support structure 1606 may include a pin receiving aperture 1604 (e.g., pin boss) configured to receive the gudgeon pin assembly 107. The pin receiving aperture 1604 may include one or more annular grooves configured to receive a pin lock 134 to secure the gudgeon pin assembly 107 in the pin receiving aperture 1604.

Figure 17A:
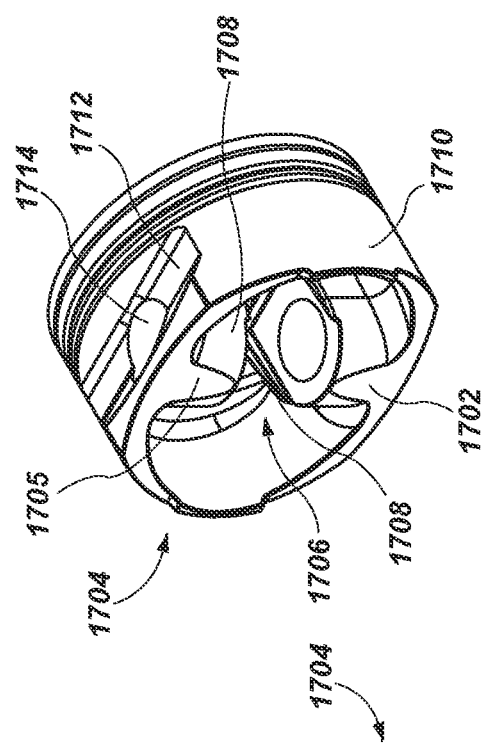
FIGS. 17A-17D show various views of a piston head of a piston assembly according to one or more embodiments of the present disclosure.
Figure 17C:
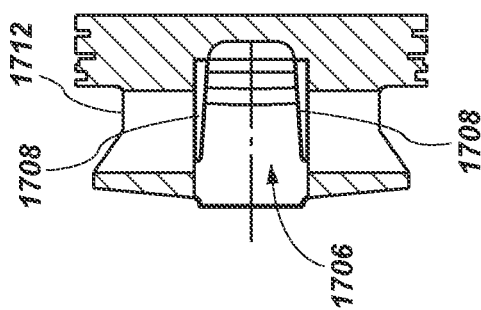
Figure 17B:
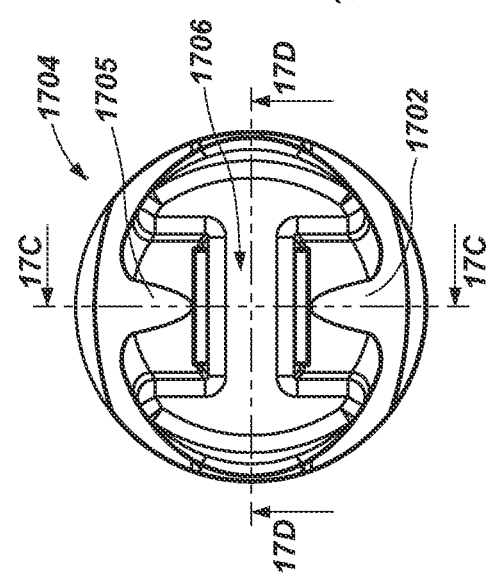
Figure 17D:
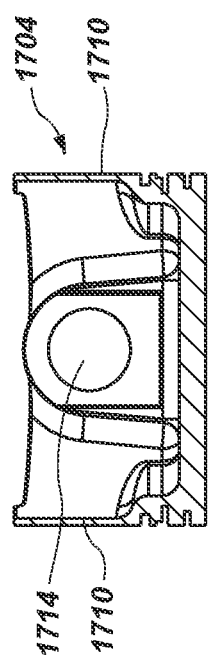

FIG. 17A shows a perspective view of a piston head 1704 according to one or more additional embodiments of the present disclosure. FIG. 17B shows a bottom view of the piston head 1704 of FIG. 17A. FIG. 17C shows a side cross-sectional view of the piston head 1704 of FIG. 17A. FIG. 17D shows another side cross-sectional view of the piston head 1704 of FIG. 17A. Referring to FIGS. 17A-17D, the piston head 1704 may be utilized within any of the piston assemblies (e.g., piston assembly 100) and any elements of the piston assemblies described above in regard to FIGS. 1-16D.

As shown in FIGS. 17A-17D, in some embodiments, the piston head 1704 may include one or more gussets 1702, 1705 for securing and fixing a position of an upper rod (e.g., upper rod 106) relative to the piston head 1704. For instance, the one or more gussets may extend downward (downward as depicted in FIGS. 17A-17D) and may at least partially define an upper rod receiving aperture 1706 in the piston head 1704. The upper rod receiving aperture 1706 may be sized and shaped to receive the upper rod and to substantially hold a position of the upper rod fixed relative to the piston head 1704 such that the upper rod does not significantly move relative to the piston head 1704 during piston strokes (e.g., the piston strokes described above). For instance, the one or more gussets 1702, 1705 and upper rod receiving aperture 1706 may hold the position of upper rod fixed relative to the piston head 1704 via mechanical interference. In some embodiments, the gussets 1702, 1705 may include protrusions 1708 (e.g., ridges) extending from the gussets 1702, 1705 to at least partially define the upper rod receiving aperture 1706. In some embodiments, the one or more gussets 1702, 1705 may be integral (e.g., may form an integral body) with the piston head 1704. In additional embodiments, the one or more gussets 1702, 1705 may include distinct members from the piston head 1704 and may be attached (e.g., welded) to the piston head 1704. The piston head 1704 may be usable with any of the gudgeon pin assemblies (e.g., the gudgeon pin assembly 107) described above.

In some embodiments, piston skirts 1710 may be defined by one or more recesses 1712 along a side of the piston head 1704. A pin receiving aperture 1714 may be defined within the recesses 1712. The pin receiving aperture 1714 may extend through the gussets 1702, 1705 between the recesses 1712 on opposite sides of the piston head 1704.

Figure 18B:
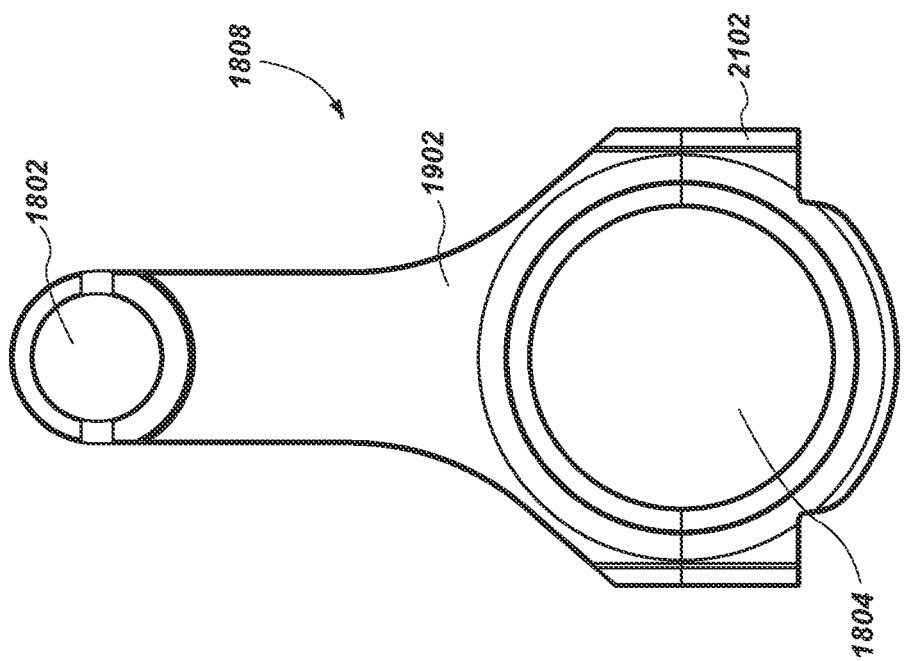
FIGS. 18A and 18B show various views of a lower rod of a piston assembly in an exploded configuration according to one or more embodiments of the present disclosure.
Figure 18A:
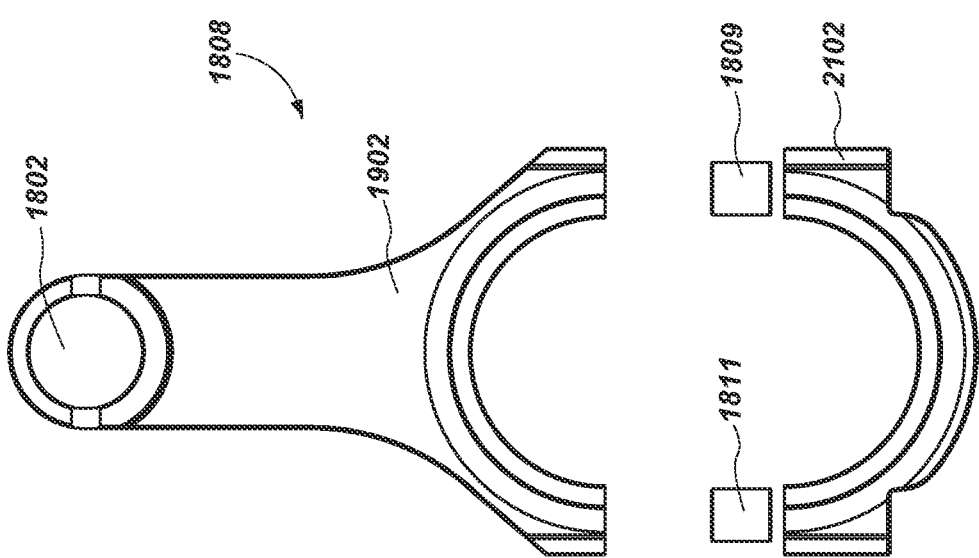
Figure 19B:
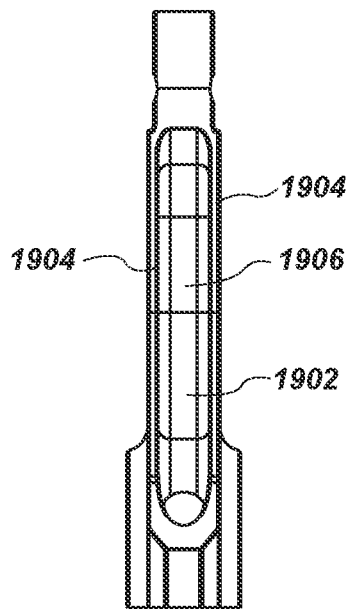
FIGS. 19A, 19B, and 19C show various views of an upper portion of the lower rod of FIGS. 18A and 18B according to one or more embodiments of the present disclosure.
Figure 19A:
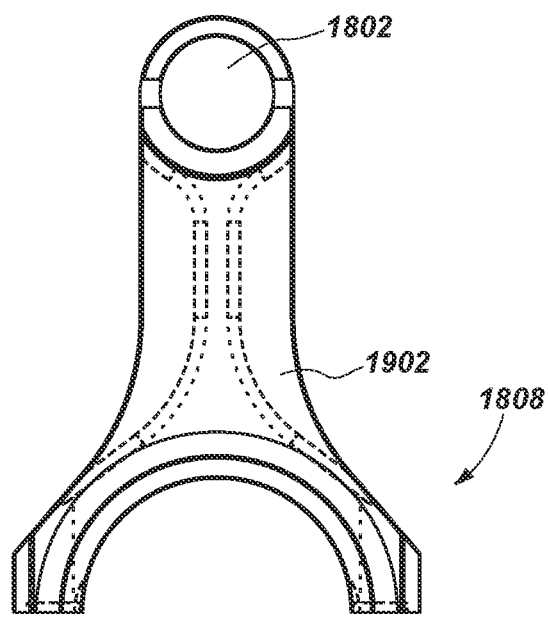
Figure 19C:
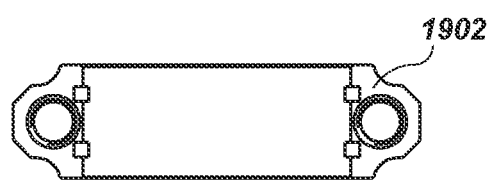
Figure 21D:
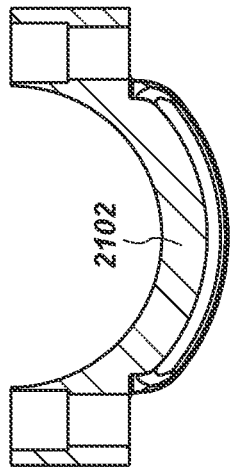
FIGS. 21A-21F show various views of a lower portion of the lower rod of FIGS. 18A and 18B according to one or more embodiments of the present disclosure.
Figure 21E:
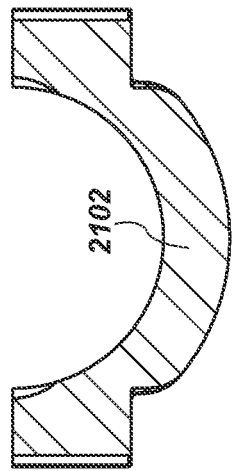
Figure 21F:
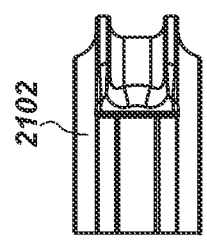
Figure 21C:
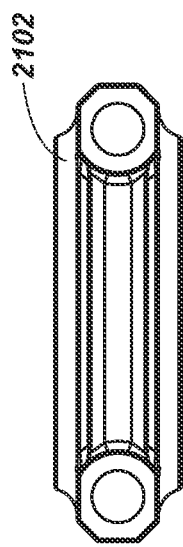
Figure 21A:
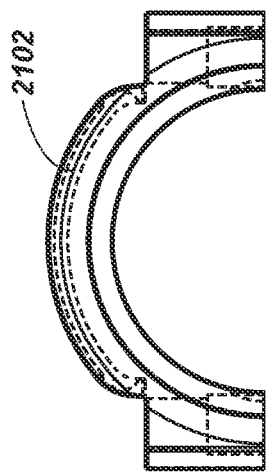
Figure 21B:
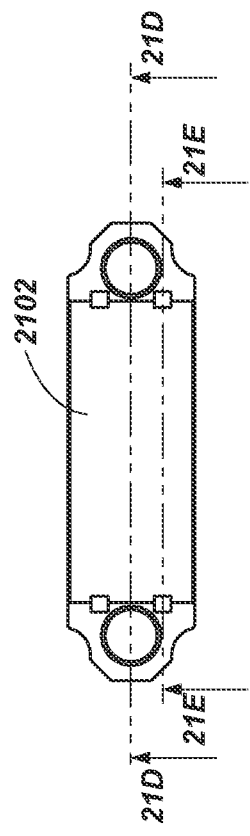
Figure 22D:
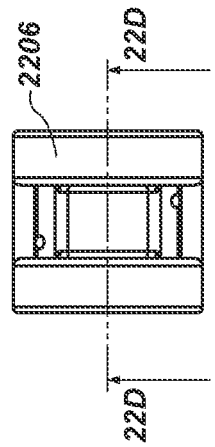
FIGS. 22A-22E show various views of an upper rod of a piston assembly according to one or more embodiments of the present disclosure.
Figure 22E:
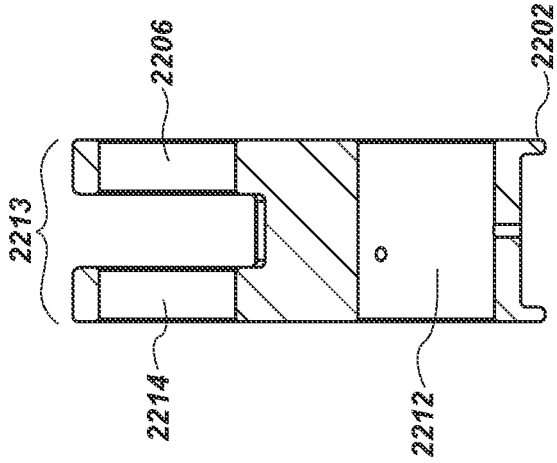
Figure 22C:
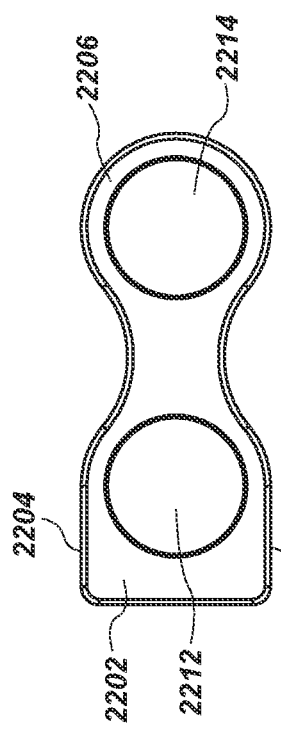
Figure 22B:
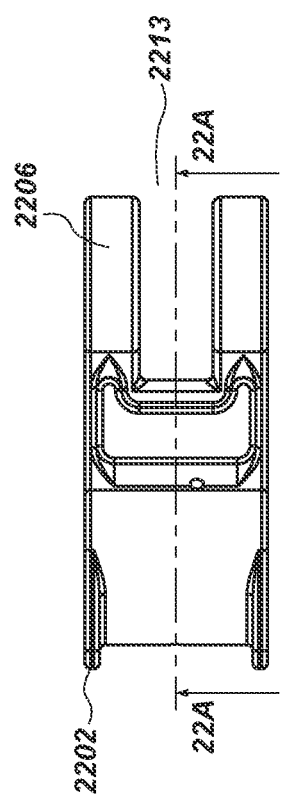
Figure 22A:
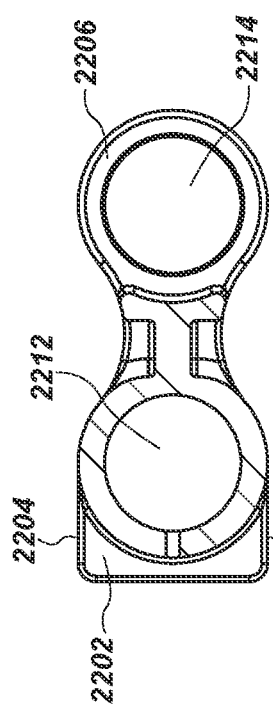

FIG. 18A is a side view of a lower rod 1808 in an exploded configuration according to one or more additional embodiments of the present disclosure. FIG. 18B is a side view of the lower rod 1808 of FIG. 18A in an assembled configuration. FIGS. 19A-19C show various views of an upper portion 1902 of the lower rod 1808 according to one or more embodiments of the present disclosure. FIGS. 20A-20D show various additional views of the upper portion 1902 of the lower rod 1808 according to one or more embodiments of the present disclosure. FIGS. 21A-21F show various views of a lower portion 2102 of the lower rod 1808 according to one or more embodiments of the present disclosure.

Figure 23B:
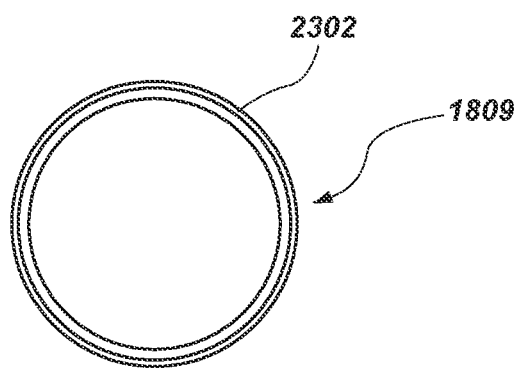
FIGS. 23A and 23B show various views of alignments sleeves of a lower rod according to one or more embodiments of the present disclosure.
Figure 23A:
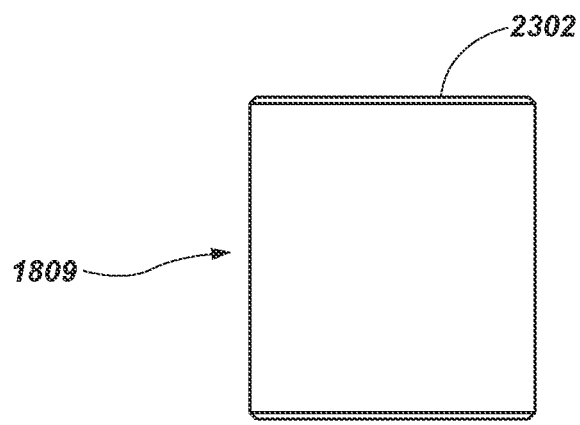

Referring to FIGS. 18A-21F together, the lower rod 1808 may be utilized within any of the piston assemblies (e.g., piston assembly 100) and any elements of the piston assemblies described above in regard to FIGS. 1-17D. Furthermore, referring to FIGS. 18A-21F together, the upper portion 1902 of the lower rod 1808 and the lower portions 2102 of the lower rod 1808 may be connected together via fasteners and/or alignment sleeves 1809, 1811. The alignment sleeves 1809, 1811 are shown in greater detail in regard to FIGS. 23A and 23B. As shown in FIGS. 23A and 23B, the alignment sleeves 1809, 1811 may include a chamfer edge 2302 formed on each longitudinal end of the alignment sleeves 1809, 1811. The upper portion 1902 and the lower portion 2102 of the lower rod 1808 may define a lower aperture 1804. The lower aperture 1804 may be configured to couple the lower rod 1808 to a journal on the crankshaft 126 as described above. The upper portion 1902 of the lower rod 1808 may include an upper aperture 1802 configured to couple the lower rod 1808 to the upper rod 2206, described below with respect to FIGS. 22A-22E.

In some embodiments, the lower rod 1808 may include one or more flanges 1904 connected through a web 1906, such as I-beam connecting rods, A-beam connecting rods, or H-beam connecting rods.

FIGS. 22A-22E show various views of an upper rod 2206 according to one or more embodiments of the present disclosure. Similar to the upper rod 106 described above, the upper rod 2206 may be coupled to a piston head (e.g., piston head 1704) via a gudgeon pin assembly (e.g., gudgeon pin assembly 107) at a first longitudinal end of the upper rod 2206 and may be coupled to a lower rod (e.g., lower rod 1808) at a second opposite longitudinal end of the upper rod 2206. In some embodiments, the upper rod 2206 may be coupled to a piston head 1704 proximate to or at a centroid of the piston head 1704. In one or more embodiments, the upper rod 2206 may be coupled to the piston head 1704 at a point that is centered between an upper surface and lower surface of the piston head 1704 and intersecting a center longitudinal axis of the piston head 1704. In some embodiments, the upper rod 2206 may be fixed relative to the piston head 1704. For instance, the upper rod 2206 may not rotate and/or translate relative to the piston head 1704 during use. In some embodiments, the upper rod 2206 may include indexing features 2202 configured to substantially rotationally fix the upper rod 2206 within the upper rod receiving aperture 1706 defined in the piston head 1704. For example, the indexing features 2202 may include a flange having substantially straight sides 2204. The substantially straight sides 2204 may be configured to interface with the gussets 1702, 1705 and/or the protrusions 1708 in the piston head 1704 to limit and/or substantially prevent the upper rod 2206 from rotating relative to the piston head 1704.

The upper rod 2206 may extend in an axial direction (e.g., in a direction parallel to the longitudinal axis of the piston head 1704) from the piston head 1704 to a region below the piston head 1704. For instance, a longitudinal length of the upper rod 2206 may be greater than a distance from a point at which the upper rod 2206 is coupled to the piston head 1704 to a lowermost surface of the piston head 1704. Furthermore, the longitudinal axis of the upper rod 2206 may be parallel to the longitudinal axis of the piston head 1704. In view of the foregoing, a lower longitudinal end of the upper rod 2206 may be oriented beneath the piston head 1704 when the upper rod 2206 is coupled to the piston head 1704. As depicted in FIGS. 22A-22E, the upper rod 2206 may include a forked portion 2213 for connecting to the lower rod 1808. The forked portion 2213 is described in greater detail below. For instance, in some embodiments, the upper rod 2206 may not include forked portion, and rather, the lower rod 1808 may include a forked portion for connecting to the upper rod 2206.

The upper rod 2206 may include an upper aperture 2212 configured to receive a gudgeon pin assembly 107 and a lower aperture 2214 configured to receive a connector pin assembly 109. The gudgeon pin assembly 107 may be inserted into the upper aperture 2212 through the pin receiving apertures 1714 in the piston head 1704. The lower aperture 2214 may be extend through the forked portion 2213 of the upper rod 2206. A knuckle joint may be formed to connect the lower rod 1808 to the upper rod 2206 with the connector pin assembly 109 being inserted through the lower aperture 2214 of the upper rod 2206 and the upper aperture 1802 of the lower rod 1808, wherein the upper aperture 1802 of the lower rod 1808 is disposed within the forked portion 2213 of the upper rod 2206.

Figure 24:
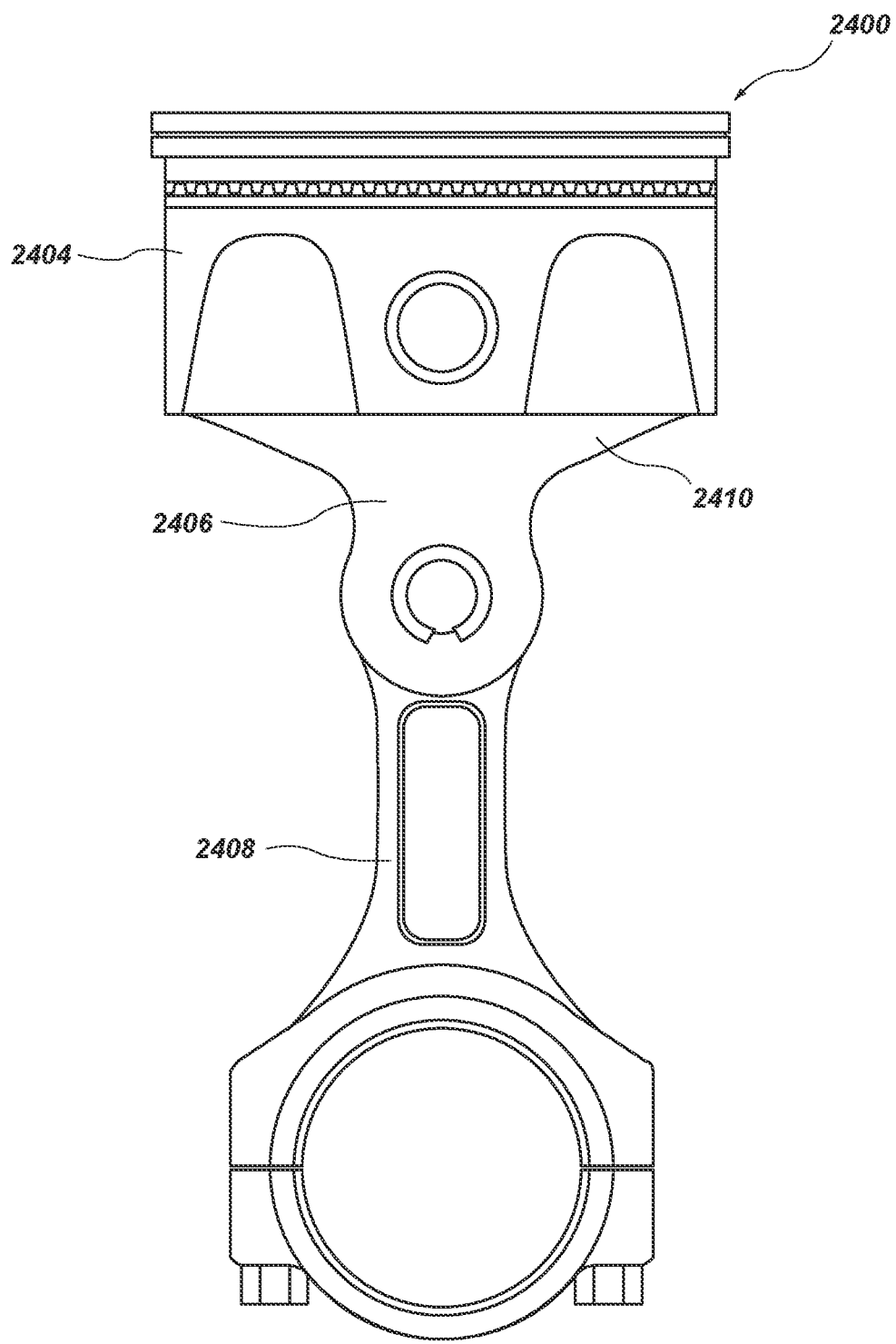
FIG. 24 shows a view of a piston assembly according to one or more embodiments of the present disclosure.

FIG. 24 shows a piston assembly 2400 according to one or more embodiments of the present disclosure. Components of the piston assembly 2400 may be utilized within any of the piston assemblies (e.g., piston assembly 100) and any elements of the piston assemblies described above in regard to FIGS. 1-23B. The piston head 2404 may be coupled to the lower rod 2408 through an upper rod 2406. In some embodiments, the upper rod 2406 may include one or more support flanges 2410 that may extend from the upper rod 2406 to a side structure of the piston head 2404 such as the piston skirt, internal gussets, etc. In some embodiments, the support flanges 2410 may extend in a substantially straight line from the upper rod 2406 to the side structure of the piston head 2404. In some embodiments, the support flanges 2410 may have a curved profile. The support flanges 2410 may substantially prevent the upper rod 2406 from rotating relative to the piston head 2404.

Referring to FIGS. 1-24 together, some embodiments include a lower rod that includes a forked portion. Additionally, the forked portion may be formed either on the upper rod or the lower rod. Furthermore, the upper rod may be attached to a gudgeon pin (e.g., a wrist pin) via any of the manners described herein and/or any conventional manners or combinations of manners. Additionally, the lower rod may be coupled to the upper rod via any manners described herein, conventional manners, and/or combinations of manners.

In some embodiments, the upper rod may be coupled to a gudgeon pin (e.g., the wrist pin between the upper rod and the lower rod) in a ball and socket configuration. For instance, the upper rod may free float relative to the lower rod. The foregoing configurations may reduce wear on the upper rod during operation of the piston assembly.

In some embodiments, the upper rod may be fixed (e.g., locked) relative to the piston head via any manner. For instance, the upper rod may be fixed relative to the piston head via any type of mechanical interference between the upper rod and the piston (e.g., welds, fittings, fasteners, adhesives, brazing). In some embodiments, the upper rod and the piston head may form a single integral body. In one or more embodiments, the upper rod may be fixed relative to the piston head via the gudgeon pin. For instance, the gudgeon pin (e.g., wrist pin) may have a non-circular shaped cross-section. For example, the gudgeon pin may have a square or rectangular-shaped cross-section, an oval-shaped cross-section, a triangular-shaped cross-section, an irregular-shaped cross-section, or any combination of the foregoing shaped cross-sections. In further embodiments, the upper rod may be fixed (e.g., locked) relative to the piston head via stops, limiters, dowels, formed angles, or centric formations (e.g., upper rod receiving apertures 1006, 1706, gears, cams, slider grooves, etc.) formed on any of the upper rod, the lower rod, and/or the piston head.

In some embodiments, the upper rod may not be fixed relative to the piston head. For instance, in one or more embodiments, the upper rod may pivot relative to the piston head. In some embodiments, an amount about which the upper rod can rotate relative to the piston head may be limited via any of the manners described above by which the upper rod can be fixed. For example, the upper rod may have a limited motion relative to the piston head. In additional embodiments, the upper rod may be free to rotate relative to the piston head.

In one or more embodiments, any element of the piston assembly (e.g., the piston head, the upper rod, the lower rod, the gudgeon pin assembly, and the connector pin assembly) may include a steel, an alloy, and/or composite material. However, the piston assembly is not limited to any specific type of material or material combination.

As the crank rotates relative to the piston, the rod may introduce forces in both an axial direction (e.g., parallel to an axis of the cylinder and piston) and a lateral direction (e.g., perpendicular (e.g., orthogonal) to the axis of the cylinder and piston). The axial forces may transmit the linear movement to or from the piston whereas the lateral forces may increase friction between the piston and the cylinder. The efficiency of the piston assembly may increase as the axial forces increase relative to the lateral forces. In some embodiments, lateral forces may cause the piston to tilt within the cylinder, such that the piston is not coaxial with the cylinder. This may increase friction between the piston and the cylinder and may increase wear of the cylinder and/or piston potentially damaging at least one of the cylinder and piston.

Figure 25:
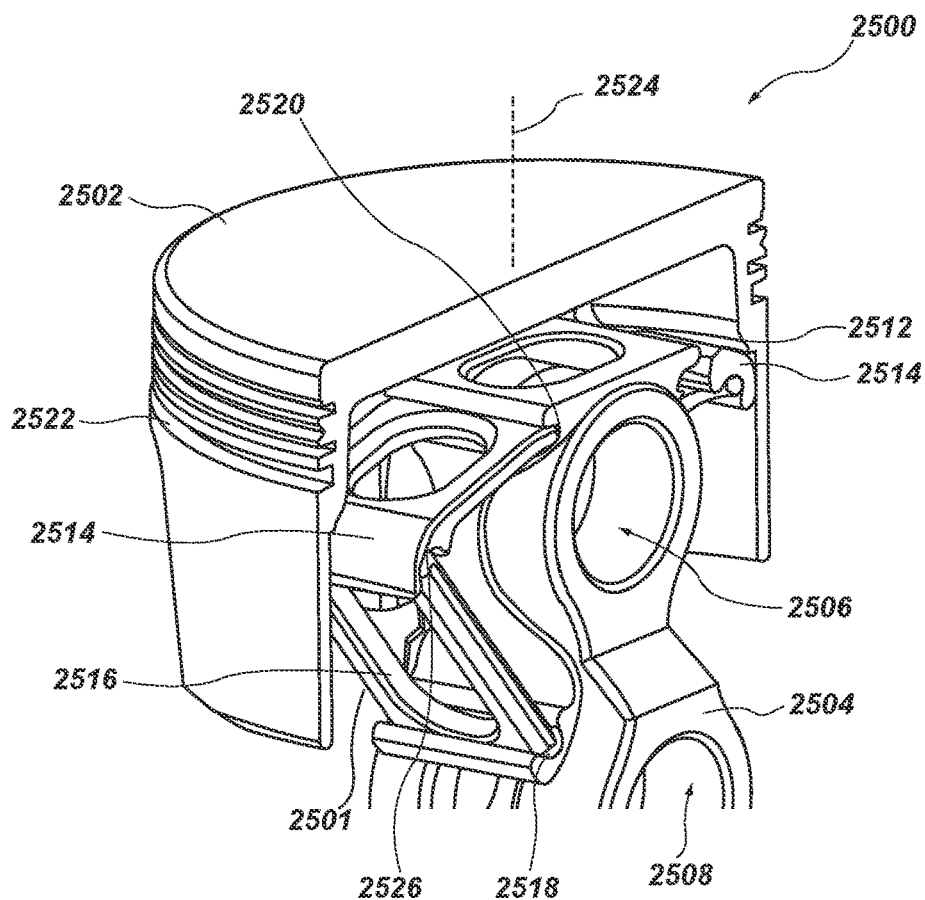
FIG. 25 illustrates a piston assembly in accordance with an embodiment of the present disclosure.

FIG. 25 illustrates a perspective cross-sectional view of a piston assembly 2500. The piston assembly 2500 may include a piston 2502 and a rod 2504. The rod 2504 may be configured to be rotationally coupled to the piston 2502 through a pin, such as a wrist pin. The pin may pass through an aperture 2506 in the rod 2504 and a complementary aperture in the piston 2502 (not shown). The pin may enable the rod 2504 to rotate in at least one direction relative to the piston 2502 (e.g., about the pin). In some embodiments, the rod 2504 may be configured to be coupled to a second rod through a second pin passing through a lower aperture 2508, such as the interface between the upper rods 106, 2206, 2406 and the lower rods 108, 2408 described above with respect to FIGS. 1-24. In other embodiments, the lower aperture 2508 may be configured to couple the rod 2504 to a crank.

When the crank is at a position other than top dead center (e.g., 0°, or 360°) or bottom dead center (180°) at least one of the rod 2504 or the lower rod may form an angle relative to an axis 2524 of the piston 2502. The angle between the rod 2504 or the lower rod and the axis 2524 may generate lateral forces. The piston 2502 may include rings 2522, which may create a seal between the piston 2502 and the respective cylinder. The rings 2522 may extend away from the piston 2502, such that the rings 2522 may create a fulcrum between the piston 2502 and the cylinder wall. As the position of the introduction of the lateral forces moves axially away from the fulcrum between the piston 2502 and the cylinder wall, a moment generated by the lateral forces may increase, which may cause the piston 2502 to tilt within the cylinder (e.g., piston rock).

The rod 2504 may include a support assembly 2501 (e.g., a support structure) configured to move the introduction point of the lateral forces to a point closer to the fulcrum between the piston 2502 and the cylinder wall. The support assembly 2501 may include one or more wings 2514, and one or more struts 2516 extending from the rod 2504. The wings 2514 may be configured to interface with wing lands 2512 in an interior portion of the piston 2502 corresponding with the rings 2522. The wings 2514 may be coupled to the rod 2504 through a top saddle 2520. The top saddle 2520 may be configured to enable the associated wing 2514 to rotate relative to the rod 2504. The strut 2516 may be coupled to the wing 2514 through a wing saddle 2526 and coupled to the rod 2504 through a bottom saddle 2518. Similar to the top saddle 2520 the bottom saddle 2518 and the wing saddle 2526 may be configured to enable the strut 2516 to rotate relative to the respective wing 2514 and rod 2504 within the bottom saddle 2518 and the wing saddle 2526. In some embodiments, the bottom saddle 2518 and the top saddle 2520 may be formed in the rod 2504. In other embodiments, the bottom saddle 2518 and the top saddle 2520 may be formed in a separate saddle assembly 2600 configured to be attached to the rod 2504, such as through a compression connection, a welded connection, an adhesive connection, etc.

Figure 26:
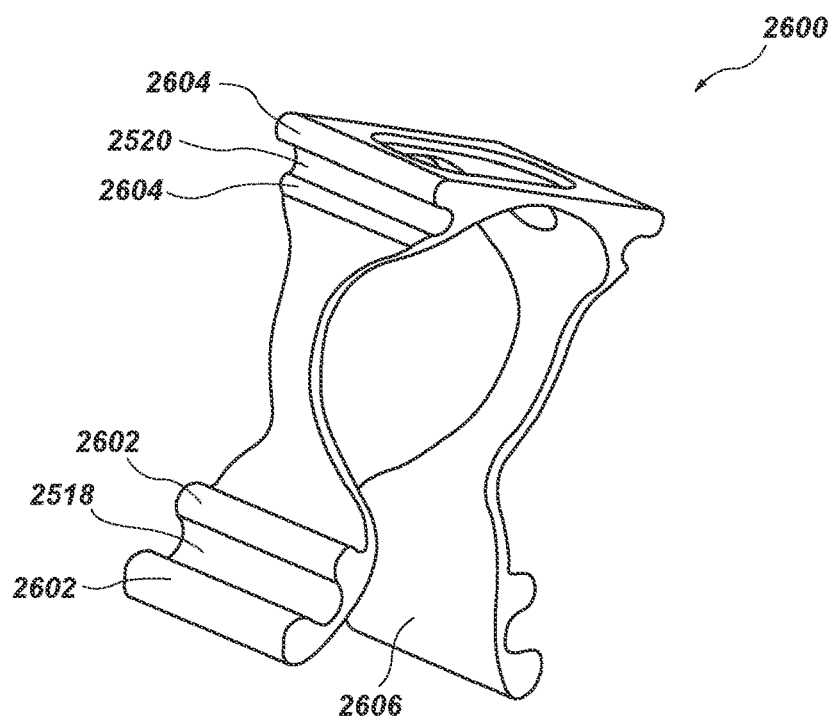
FIG. 26 illustrates an embodiment of a saddle assembly in accordance with an embodiment of the present disclosure.

FIG. 26 illustrates a saddle assembly 2600. As discussed above, the saddle assembly 2600 may be a separate piece configured to be attached to the rod 2504. In other embodiments, the features of the saddle assembly 2600 may be integrated into the rod 2504, such as through a machining process, a forging process, a casting process, etc.

The saddle assembly 2600 may include a top saddle 2520 and a bottom saddle 2518. The top saddle 2520 may include top saddle retainers 2604 and the bottom saddle 2518 may include bottom saddle retainers 2602. The top saddle retainers 2604 may be configured to retain a wing 2514 in the top saddle 2520. For example, the top saddle 2520 may form a substantially circular recess between the top saddle retainers 2604. The top saddle retainers 2604 may define a space between the top saddle retainers 2604, such that the wing 2514 may be received between the top saddle retainers 2604 into the substantially circular recess of the top saddle 2520.

The bottom saddle retainers 2602 may be configured to retain a strut 2516 in the bottom saddle 2518. For example, the bottom saddle 2518 may form a substantially circular recess between the bottom saddle retainers 2602. The bottom saddle retainers 2602 may define a space between the bottom saddle retainers 2602, such that the strut 2516 may be received between the bottom saddle retainers 2602 into the substantially circular recess of the bottom saddle 2518.

The saddle assembly 2600 may include an interior surface 2606 having a substantially complementary shape to the rod 2504. The saddle assembly 2600 may be formed from a material that is capable of withstanding the forces and temperatures that are typical within an engine or compressor, such as a metal material (e.g., aluminum, steel, titanium, stainless steel, hypereutectic alloys, etc.). In some embodiments, the saddle assembly 2600 may be formed from a material that is substantially the same as the rod 2504. In other embodiments, the saddle assembly 2600 may be formed from a different material than the rod 2504.

Figure 27:
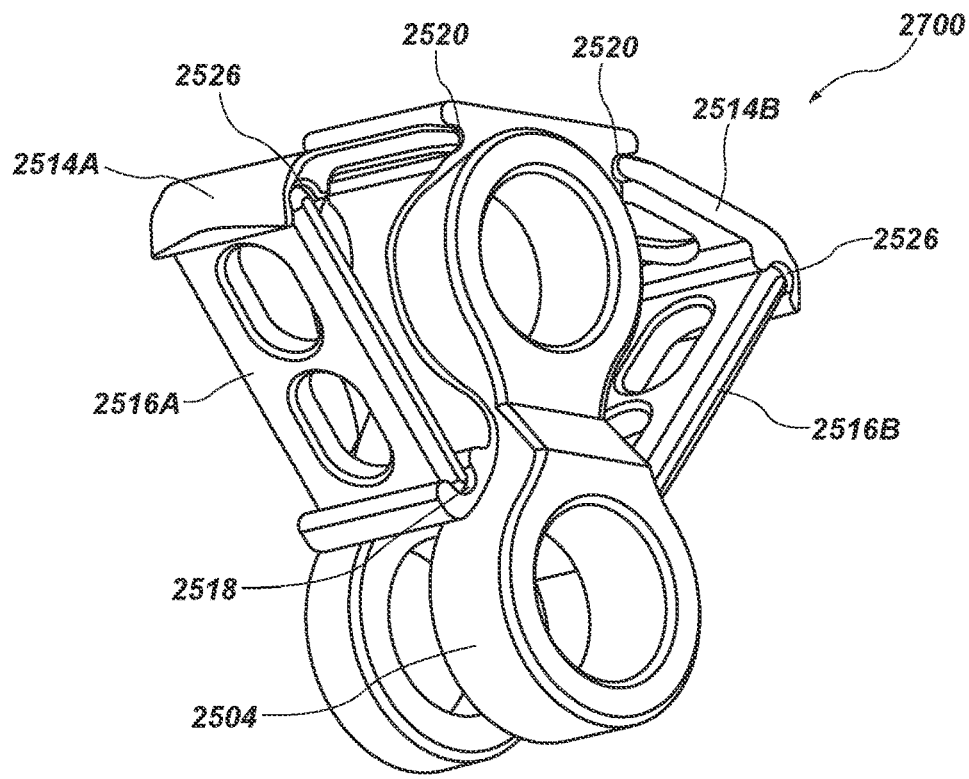
FIG. 27 illustrates a rod assembly in accordance with an embodiment of the present disclosure.
Figure 28:
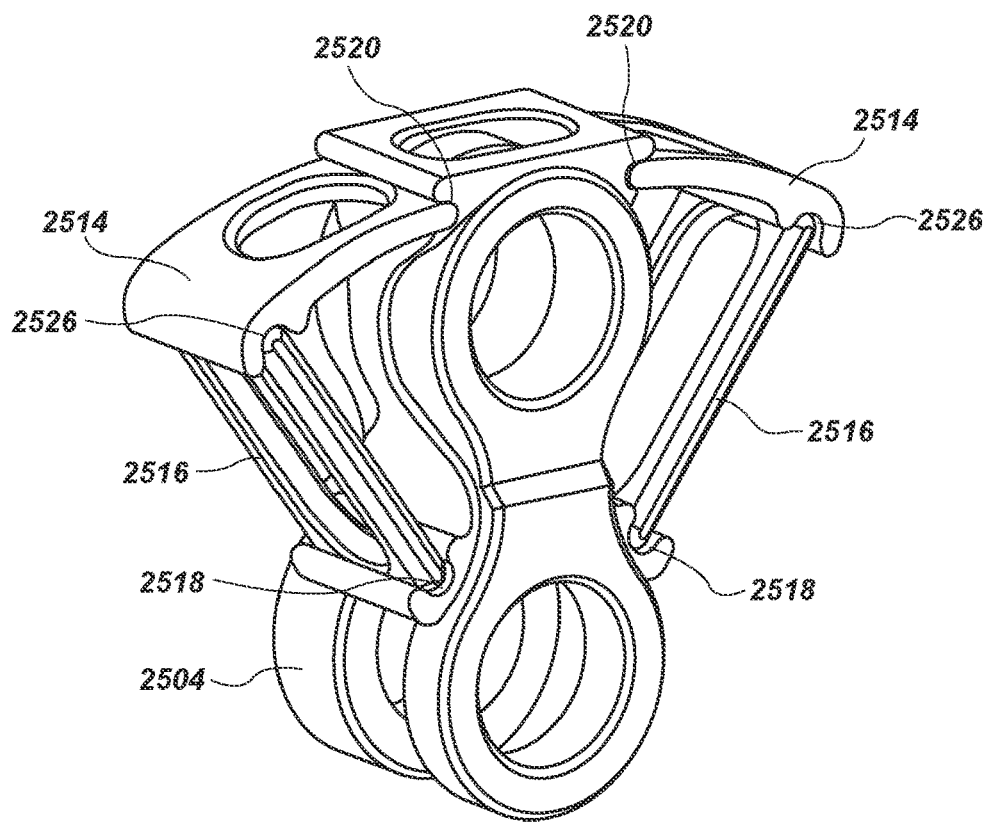
FIG. 28 illustrates the rod assembly of FIG. 27, in accordance with an embodiment of the present disclosure.

FIGS. 27 and 28 illustrates views of a support assembly 2700. As described above, the support assembly 2700 includes one or more wings 2514 and one or more struts 2516 extending from the rod 2504. The components of the support assembly 2700 may be formed from a material that is capable of withstanding the forces and temperatures that are typical within an engine or compressor, such as a metal material (e.g., aluminum, steel, titanium, stainless steel, hypereutectic alloys, etc.). In some embodiments, each of the components of the support assembly 2700 may be formed from the same materials. In other embodiments, different components of the support assembly 300 may be formed from different materials.

The wings 2514 may be coupled to the rod 2504 through the top saddle 2520 of the saddle assembly 2600. The wings 2514 may be arranged to extend in substantially opposing directions from the rod 2504. The struts 2516 may be coupled to the rod 2504 through the bottom saddles 2518 of the saddle assembly 2600. The struts 2516 may also extend in substantially opposite directions from the rod 2504. The struts 2516 may interface with the respective wings 2514 through the wing saddles 2526. The struts 2516 may transmit forces from the lower portion of the rod 2504 proximate the bottom saddle 2518 to the wings 2514. The piston 2502 (FIG. 25) may also transmit forces to the rod 2504 through the wings 2514 and the struts 2516. In some cases, forces may be transferred from one side of the piston 2502 to the other through the wings 2514 and the struts 2516. For example, if the piston 2502 experiences a force biased on a first side of the piston, the force may be transmitted from the piston 2502 through a first wing 2514A and a first strut 2516A. At least a portion of the force may then be transmitted back to the piston on a second side of the piston 2502 through a second strut 2516B and a second wing 2514B opposite the first strut 2516A and the first wing 2514A. Thus, the support assembly 2700 may balance forces on the piston 2502.

Figure 29:
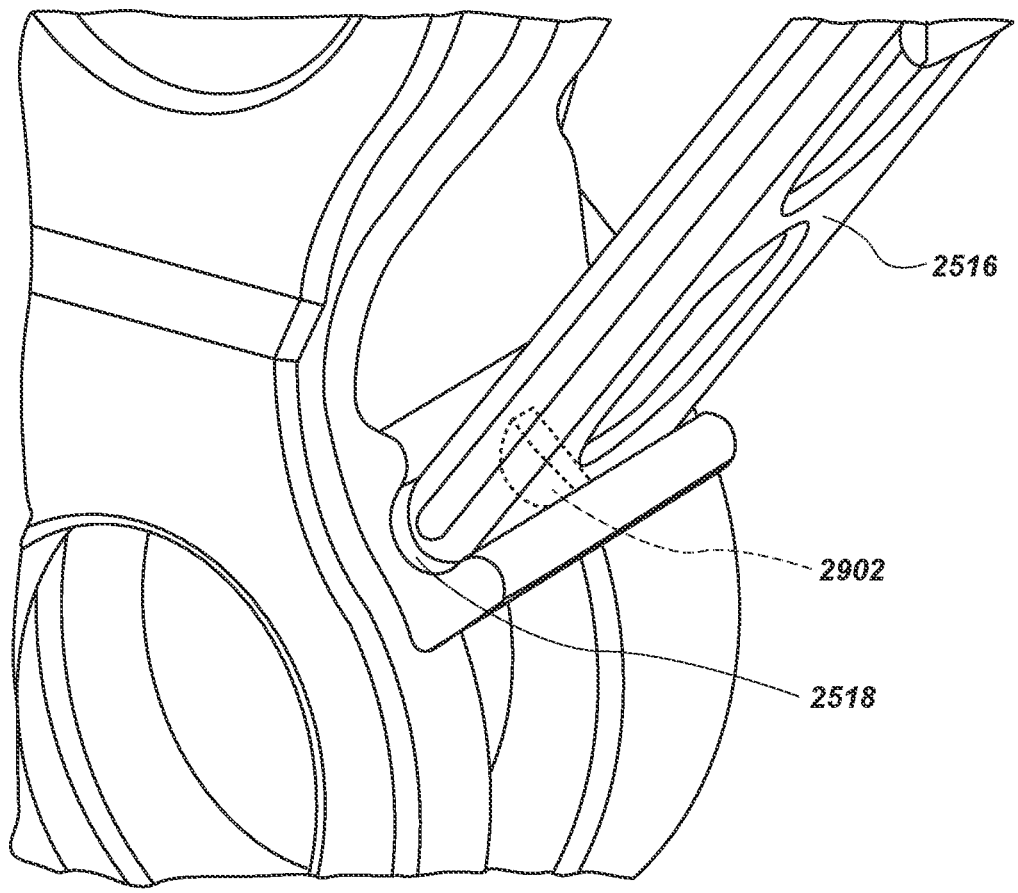
FIG. 29 illustrates an expanded view of a portion of the rod assembly of FIGS. 27 and 4 in accordance with an embodiment of the present disclosure.
Figure 30:
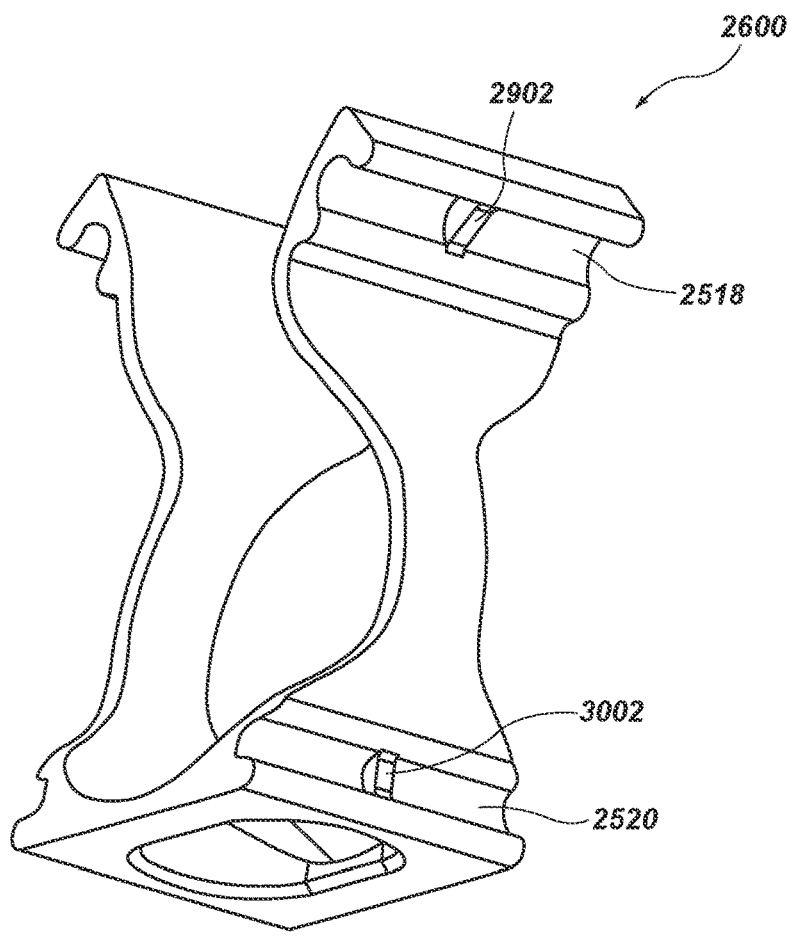
FIG. 30 illustrates a perspective view of a saddle assembly in accordance with an embodiment of the present disclosure.
Figure 31:
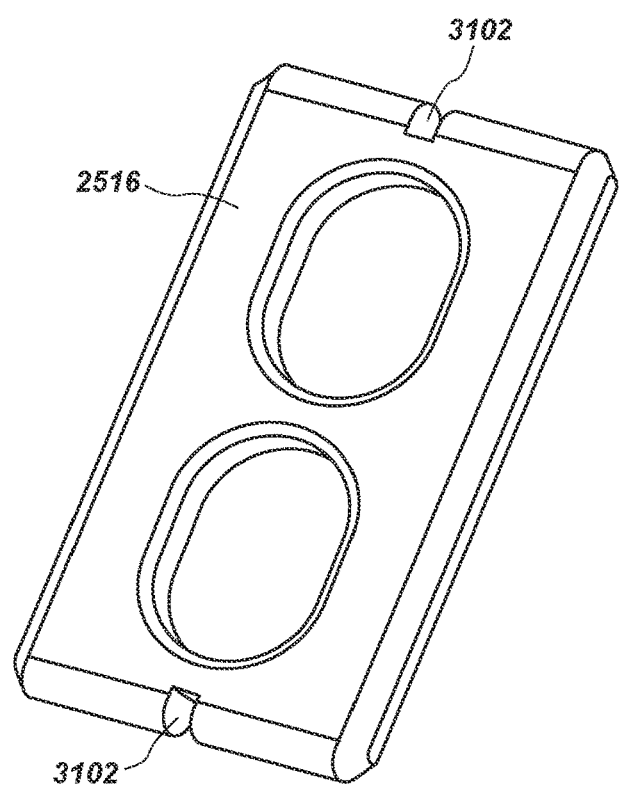
FIG. 31 illustrates a perspective view of a strut in accordance with an embodiment of the present disclosure.
Figure 32:
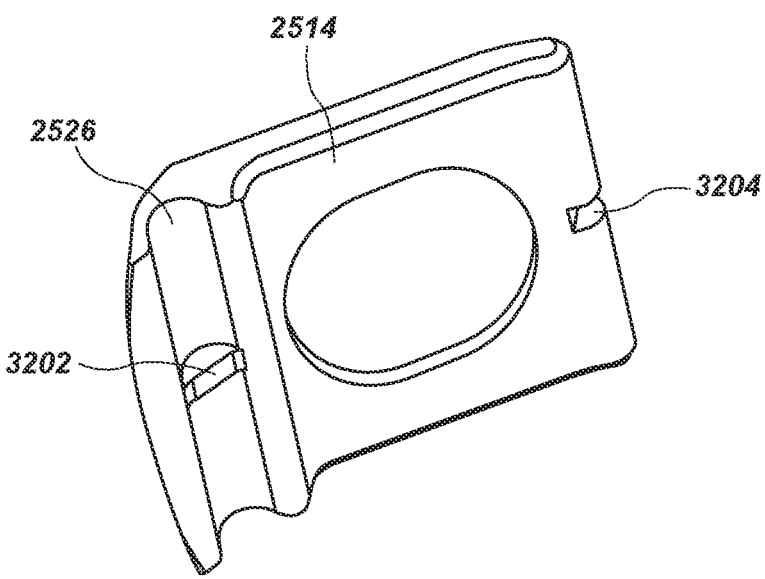
FIG. 32 illustrates a perspective view of a wing in accordance with an embodiment of the present disclosure.

FIGS. 29-32 illustrate views of the components of the support assembly 2700. FIG. 29 illustrates a close-up view of the bottom saddle 2518 of the saddle assembly 2600 and the interface between the bottom saddle 2518 and the strut 2516. FIGS. 30-32 illustrate component views of the saddle assembly 2600, strut 2516, and wing 2514 respectively. The strut 2516 may include a bottom retaining element 2902. The bottom retaining element 2902 may be configured to interface with a complementary retaining element 3102 of the strut 2516. The saddle assembly 2600 may also include a top retaining element 3002 configured to interface with a complementary retaining element 3204 of the wing 2514. The bottom retaining element 2902 and the top retaining element 3002 may be configured to limit movement from side to side (e.g., along an axis of the rotational connection between the top saddle 2520 or the bottom saddle 2518 and the respective wing 2514 or strut 2516). For example, the bottom retaining element 2902 and/or the top retaining element 3002 may be a ridge or a pin extending from the respective bottom saddle 2518 or top saddle 2520. The respective complementary retaining element 3102 or complementary retaining element 3204 may be a complementary recess configured to receive the ridge or pin. The interface between the bottom retaining element 2902 and the complementary retaining element 3102 of the strut 2516 may be configured to enable the strut 2516 to rotate about the axis defined by the bottom saddle 2518 limit movement in the axial direction. The respective interface between the top retaining element 3002 the complementary retaining element 3204 of the wing 2514 may be configured in a similar manner to enable the wing 2514 to rotate about the axis defined by the top saddle 2520 limit movement in the axial direction.

The wing 2514 may include a wing retaining element 3202 defined in the wing saddle 2526 of the wing 2514. The wing retaining element 3202 may be configured to interface with another complementary retaining element 3102 of the strut 2516. The interface between the wing retaining element 3202 and the complementary retaining element 3102 of the strut 2516 may be configured to enable the strut 2516 to rotate about the axis defined by the wing saddle 2526 limit movement in the axial direction.

Figure 33:
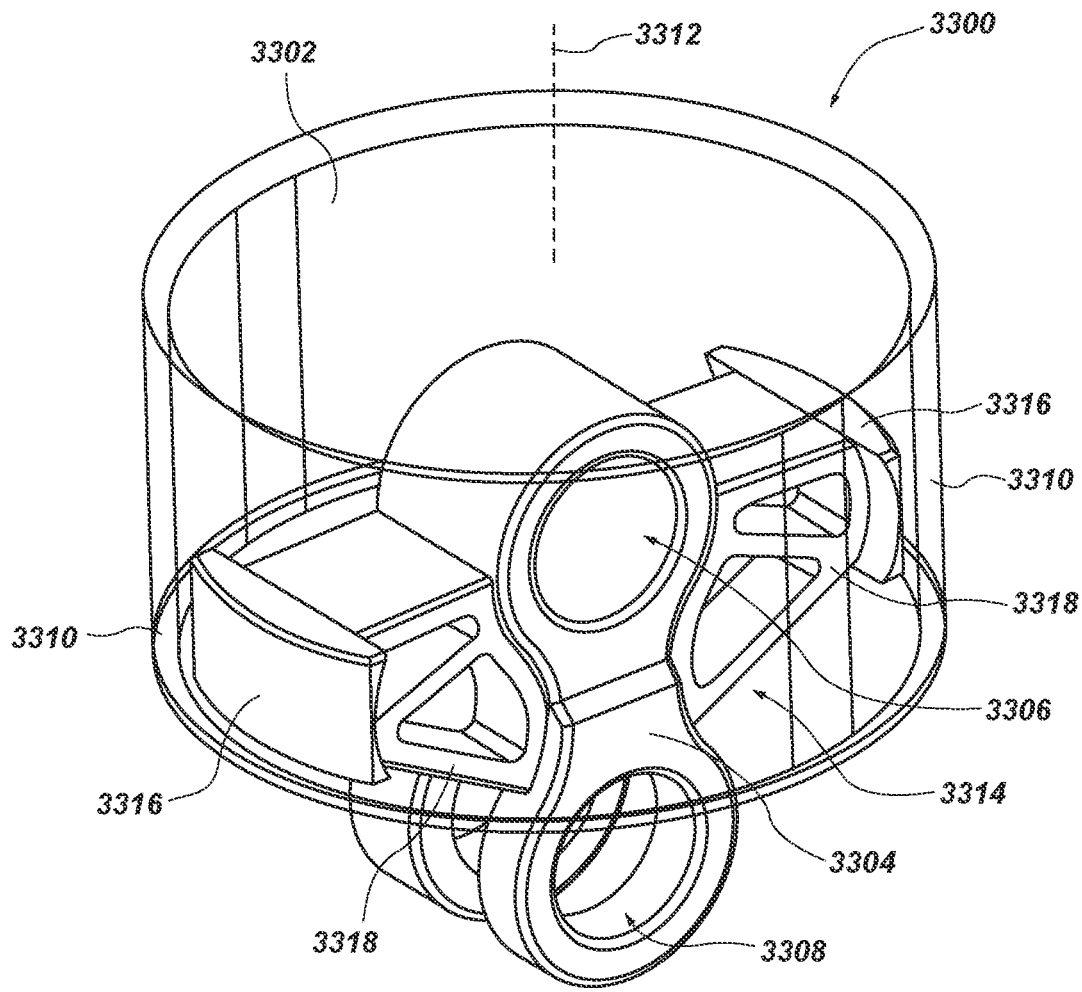
FIGS. 33 and 34 illustrate a piston assembly in accordance with an embodiment of the present disclosure.

FIG. 33 illustrates a perspective cross sectional view of a piston assembly 3300. The piston assembly 3300 may include a piston 3302 and a rod 3304. The rod 3304 may be configured to be rotationally coupled to the piston 3302 through a pin, such as a wrist pin. The pin may pass through an aperture 3306 in the rod 3304 and a complementary aperture in the piston 3302 (not shown). The pin may enable the rod 3304 to rotate in at least one direction relative to the piston 3302. In some embodiments, the rod 3304 may be configured to be coupled to a second rod through a second pin passing through a lower aperture 3308, such as the interface between the upper rods 106, 2206, 2406 and the lower rods 108, 2408 described above with respect to FIGS. 1-24. In other embodiments, the lower aperture 3308 may be configured to couple the rod 3304 to a crank.

When the crank is at a position other than top dead center (e.g., 0°, or 360°) or bottom dead center (180°) at least one of the rod 3304 or the lower rod may form an angle relative to an axis 3312 of the piston 3302. The angle between the rod 3304 or the lower rod and the axis 3312 may generate lateral forces. The piston 3302 may include rings 3402 (FIG. 34), which may create a seal between the piston 3302 and the respective cylinder. The rings may extend away from the piston 3302, such that the rings may create a fulcrum between the piston 3302 and the cylinder wall. As the position of the introduction of the lateral forces moves axially away from the fulcrum between the piston 3302 and the cylinder wall, a moment generated by the lateral forces may increase, which may cause the piston 3302 to tilt within the cylinder (e.g., piston rock).

The rod 3304 may include a support assembly 3314 (e.g., a support structure) configured to move the introduction point of the lateral forces to a point closer to the fulcrum between the piston 3302 and the cylinder wall. The support assembly 3314 may include struts 3318 extending from the rod 3304 and shoes 3316 coupling the struts 3318 to the skirt 3310 of the piston 3302. In some embodiments, the struts 3318 may be formed as part of the rod 3304. In other embodiments, the struts 3318 may be separate structures configured to be coupled to the rod 3304. In some embodiments, the shoes 3316 may be formed as part of the piston 3302 within the skirt 3310 of the piston 3302. In other embodiments, the shoes 3316 may be separate structures configured to be coupled to the skirt 3310 of the piston 3302.

Figure 34:
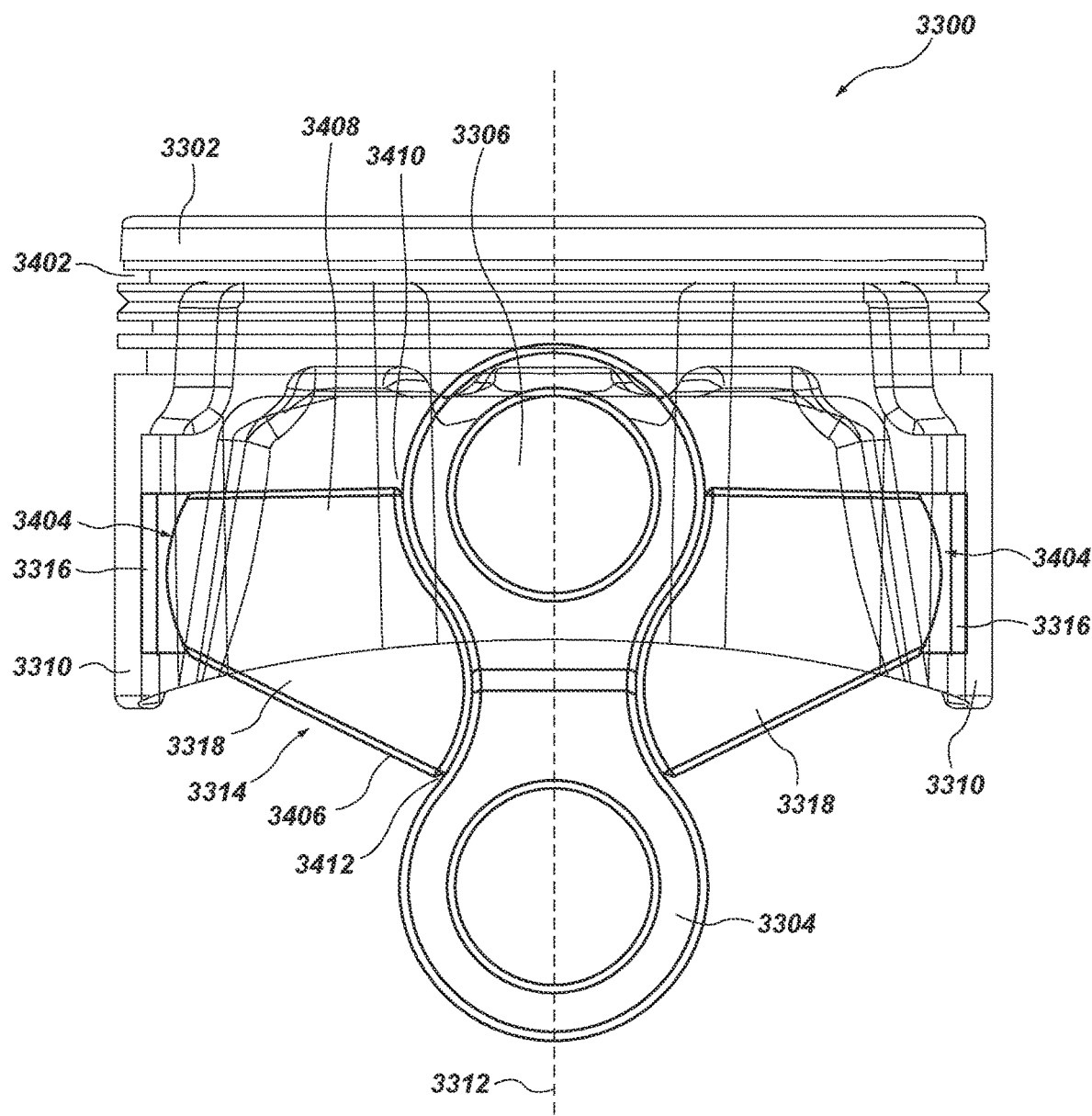

FIG. 34 illustrates a side view of the piston assembly 3300. The support assembly 3314 may be configured to transmit lateral forces (e.g., non-axial forces or forces that are not aligned with the axis 3312 of the piston assembly 3300) from the rod 3304 to an inside portion of the skirts 3310 of the piston 3302. The shoes 3316 may operatively control the contact point between the support assembly 3314 and the skirts 3310 of the piston 3302, whereas the struts 3318 may operatively control the contact point between the support assembly 3314 and the rod 3304.

An interface 3404 between the struts 3318 and the shoes 3316 may be a moveable interface 3404. For example, the shoes 3316 and the struts 3318 may have complementary geometry, such as complementary curves, radii, etc., such that the struts 3318 may move relative to the shoes 3316 along the interface 3404. The interface 3404 between the struts 3318 and the shoes 3316 may enable the rod 3304 to move relative to the piston 3302, such as enabling rotation about the aperture 3306.

In some embodiments, limits may be placed on the amount of movement allowed between the rod 3304 and the piston 3302. For example, the geometry of the struts 3318 may define limits for the amount of movement allowed between the rod 3304 and the piston 3302. The struts 3318 may include a lower edge 3406 and an upper edge 3408. The lower edge 3406 and the upper edge 3408 may have different lengths. For example, the lower edge 3406 may be longer than the upper edge 3408, such that as the rod 3304 rotates relative to the piston 3302 about the aperture 3306, a force between the strut 3318 and the shoe 3316 may increase until the movement is substantially stopped.

The geometric movement limitations may include limitations introduced by a position of the support assembly 3314 relative to the rod 3304 and the piston 3302. For example, the upper edge 3408 may be substantially aligned with an axis of rotation of the aperture 3306, such that as the rod 3304 rotates about the axis of rotation a distance between the shoe 3316 and the upper connection 3410 between the upper edge 3408 and the rod 3304 may remain substantially the same. The lower edge 3406 of the strut 3318 may be positioned a distance along the rod 3304 from the axis of rotation, such that as the rod 3304 rotates about the axis of rotation a distance between the shoe 3316 and the lower connection 3412 between the lower edge 3406 and the rod 3304 may change, such that a force between the shoe 3316 and the strut 3318 at the interface 3404 may increase or decrease proportionally the amount of rotation between the rod 3304 and the piston 3302. For example, as the rod rotates toward the shoe 3316 reducing the distance between the rod 3304 and the shoe 3316, the force may increase. Similarly, as the rod 3304 rotates away from the shoe 3316, increasing the distance between the rod 3304 and the shoe 3316, the forces between the strut 3318 and the shoe 3316 may reduce.

The lower edge 3406 of the strut 3318 may be arranged at an angle relative to the rod 3304 extending from a point on the rod 3304 below the bottom of the skirt 3310 of the piston 3302 to a point within the skirt 3310 of the piston 3302. The angle of the lower edge 3406 of the strut 3318 may be configured to transfer forces being transmitted through the rod 3304 to the shoe 3316. Transferring the lateral forces from the lower portion of the rod 3304 to the shoe 3316 within the skirt 3310 of the piston 3302 may substantially reduce the moment induced on the piston 3302, which may reduce the amount of tilt induced on the piston 3302 substantially reducing friction losses, wear, and/or damage induced by piston tilt.

Figure 35:
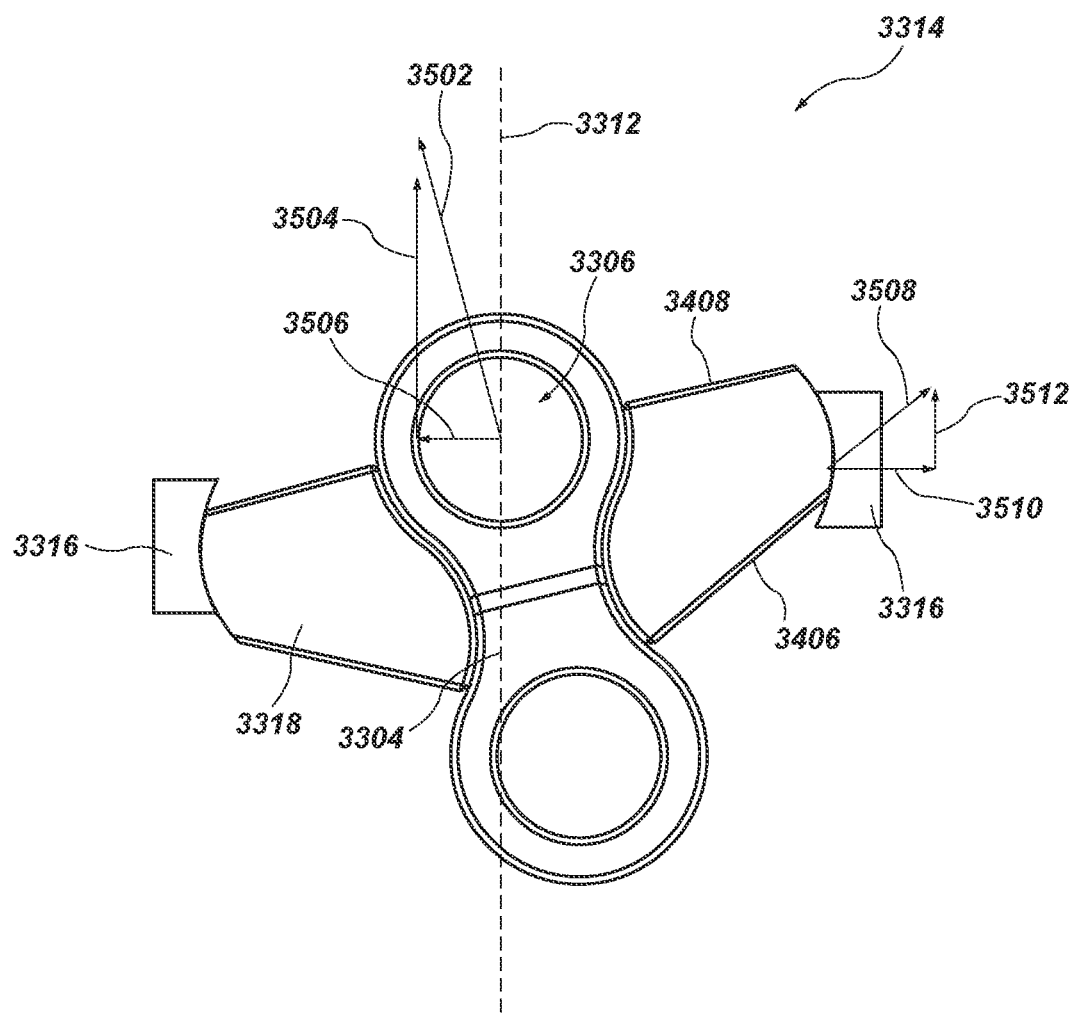
FIG. 35 illustrates diagrammatic view of a support assembly in accordance with an embodiment of the present disclosure.

FIG. 35 illustrates a force diagram of the support assembly 3314. During operation the rod 3304 may be positioned at an angle relative to the axis 3312 of the piston assembly 3300, such that the rod 3304 may be inducing both axial forces and lateral forces on the piston 3302. Because the axis of rotation defined by the aperture 3306 is not aligned with the rings 3402, the lateral forces induced by the rod 3304 may generate a moment about the fulcrum defined by the rings 3402, which may cause the piston 3302 to tilt within the cylinder. As illustrated in FIG. 35, the support assembly 3314 may be configured to introduce an opposing lateral force on the shoes 3316 configured to oppose the lateral forces introduced by the rod 3304, substantially reducing any moment generated by the lateral forced induced by the rod 3304.

For example, the rod 3304 may induce a rod force 3502 in the piston 3302 at the aperture 3306. The direction of the rod force 3502 may be at substantially the same angle relative to the axis 3312 as the rod 3304. The angle may cause the rod force 3502 to introduce both lateral rod forces 3506 and axial rod forces 3504. As described above, the lateral rod forces 3506 may generate a moment about the fulcrum defined by the rings 3402 of the piston 3302.

As described above, the geometry of the strut 3318 may cause forces between the strut 3318 and the shoe 3316 to increase as the rod 3304 rotates relative to the piston 3302 about the aperture 3306. Thus, the strut 3318 may introduce a strut force 3508 onto the shoe 3316, which may transfer the strut force 3508 to the piston 3302 through the skirt 3310 of the piston 3302. The strut force 3508 may include both lateral strut forces 3510 and axial strut forces 3512. As shown in FIG. 35, the axial strut forces 3512 and the axial rod forces 3504 may be in substantially the same direction, such that the axial strut forces 3512 and the axial rod forces 3504 may combine increasing the axial force being applied to the piston 3302. The lateral strut forces 3510 may be in a direction opposite the direction of the lateral rod forces 3506. Similar to the lateral rod forces 3506, the lateral strut forces 3510 may generate a moment on the piston 3302 about the fulcrum defined by the rings 3402. However, the moment generated by the lateral strut forces 3510 may be in an opposite direction from the moment generated by the lateral rod forces 3506, such that the two moments may substantially cancel one another. In other words, the net moment generated on the piston 3302 by the rod moment and the strut moment may be substantially zero.

Reducing the moment generated on the piston 3302, may substantially reduce the tilt of the piston 3302 within the cylinder. Reducing the tilt of the piston 3302 may substantially reduce friction losses, wear, and/or damage induced by piston tilt.

Figure 36:
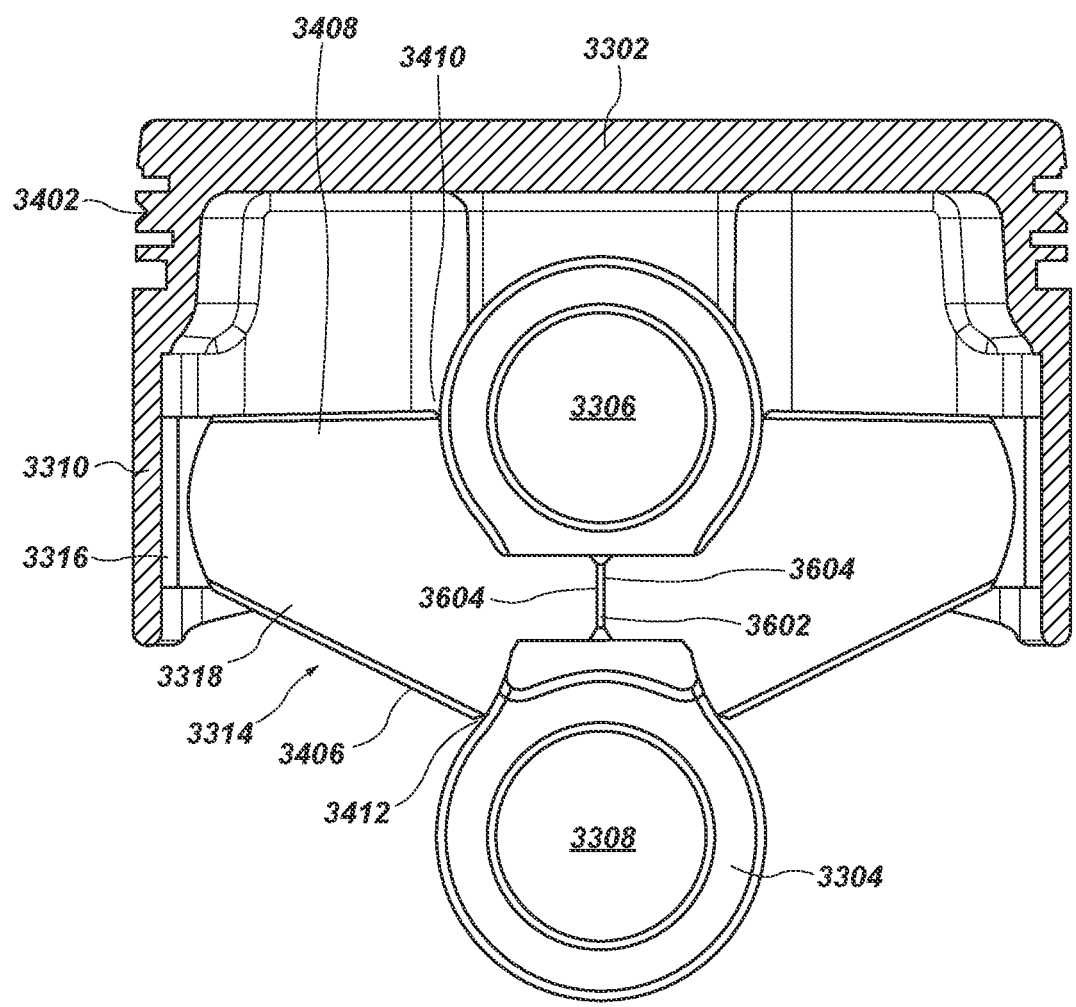
FIGS. 36 through 39 illustrate views of a piston assembly in accordance with one or more embodiments of the present disclosure.

FIG. 36 illustrates a cross-sectional side view of the piston assembly 3300. In some embodiments, the portion of the rod 3304 between the aperture 3306 and the lower aperture 3308 may include side flanges separated by a web 3602, such as an H-beam structure commonly referred to as an H-beam rod. The support assembly 3314 may be inserted between the side flanges, such that an inner edge 3604 of the struts 3318 may abut against the web 3602 of the rod 3304. The geometry of the struts 3318 may be configured to substantially interlock with the rod 3304 (e.g., be substantially complementary to the geometry of the rod 3304), such that the struts 3318 may be configured to move with the rod 3304 as substantially one piece relative to the piston 3302 and the shoes 3316.

The interlocking geometry may increase an efficiency of the force transferred from the rod 3304 to the shoes 3316 through the struts 3318. Increasing the efficiency of the force transfer may improve the balance between the lateral rod forces 3506 and the lateral strut forces 3510, which may reduce any moment generated on the piston 3302 as described above.

Figure 37:
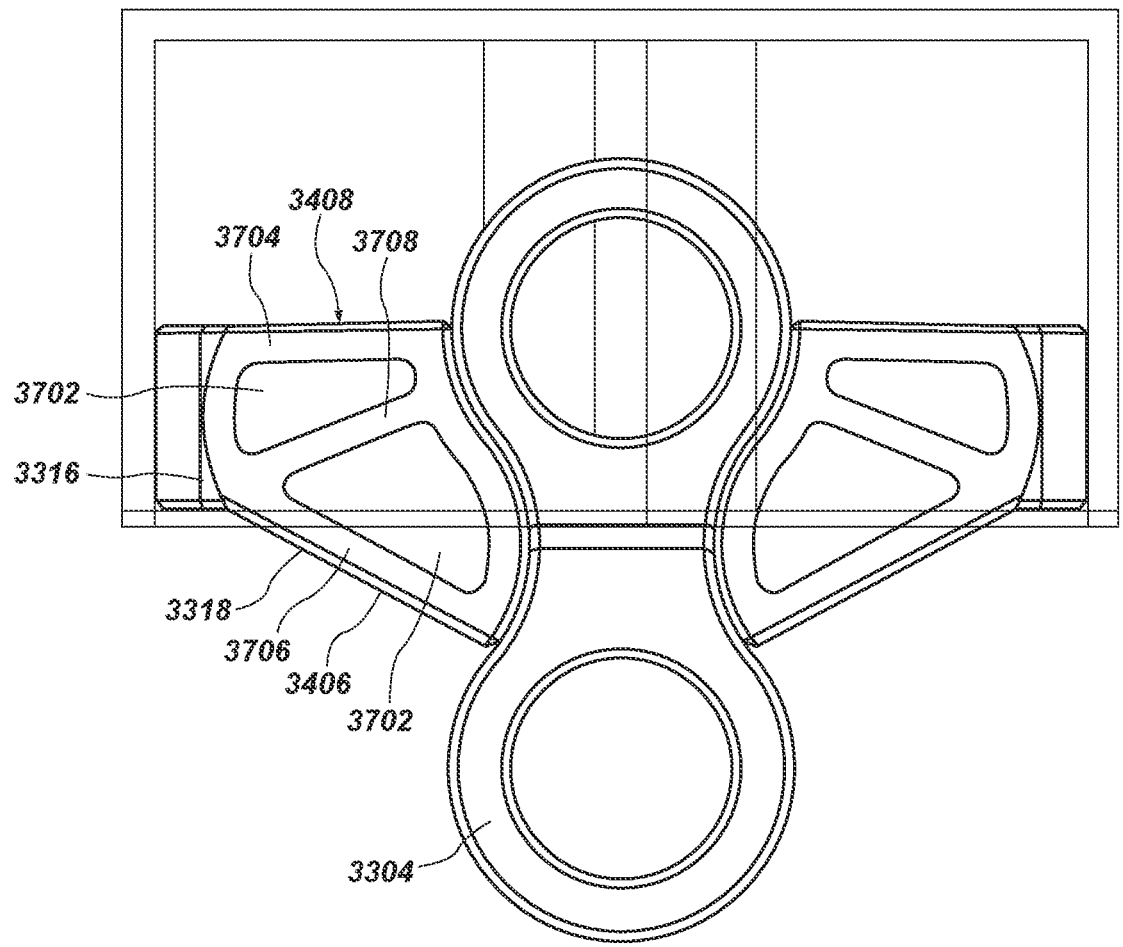

FIG. 37 illustrates a side view of the piston assembly 3300. In some embodiments, the strut 3318 may include multiples braces separated by spaces 3702. For example, the strut 3318 may include an upper brace 3704 corresponding to the upper edge 3408 of the strut 3318 and a lower brace 3706 corresponding to the lower edge 3406 of the strut 3318. In some embodiments, the strut 3318 may also include one or more intermediate braces 3708 for additional strength.

In some embodiments, the spaces 3702 between the braces 3704, 3706, 3708 may be apertures extending completely through the strut 3318. In other embodiments, the spaces 3702 may be recesses extending partially through the strut 3318, such that the braces 3704, 3706, 3708 may be connected through webbing extending through the spaces 3702 between the braces 3704, 3706, 3708.

The spaces 3702 may reduce a weight of the struts 3318 by reducing the amount of material included in the struts 3318. Reducing a weight of the struts 3318 may reduce a weight of the piston assembly 3300. Reducing the weight of the piston assembly 3300 may increase an efficiency of the associated apparatus (e.g., engine, compressor, etc.). Furthermore, reducing the weight of the piston assembly 3300 may reduce the forces on the components of the piston assembly 3300 where the direction of the piston assembly 3300 changes (e.g., top dead center, bottom dead center), which may reduce wear and/or fatigue on the components of the piston assembly 3300.

Figure 38:
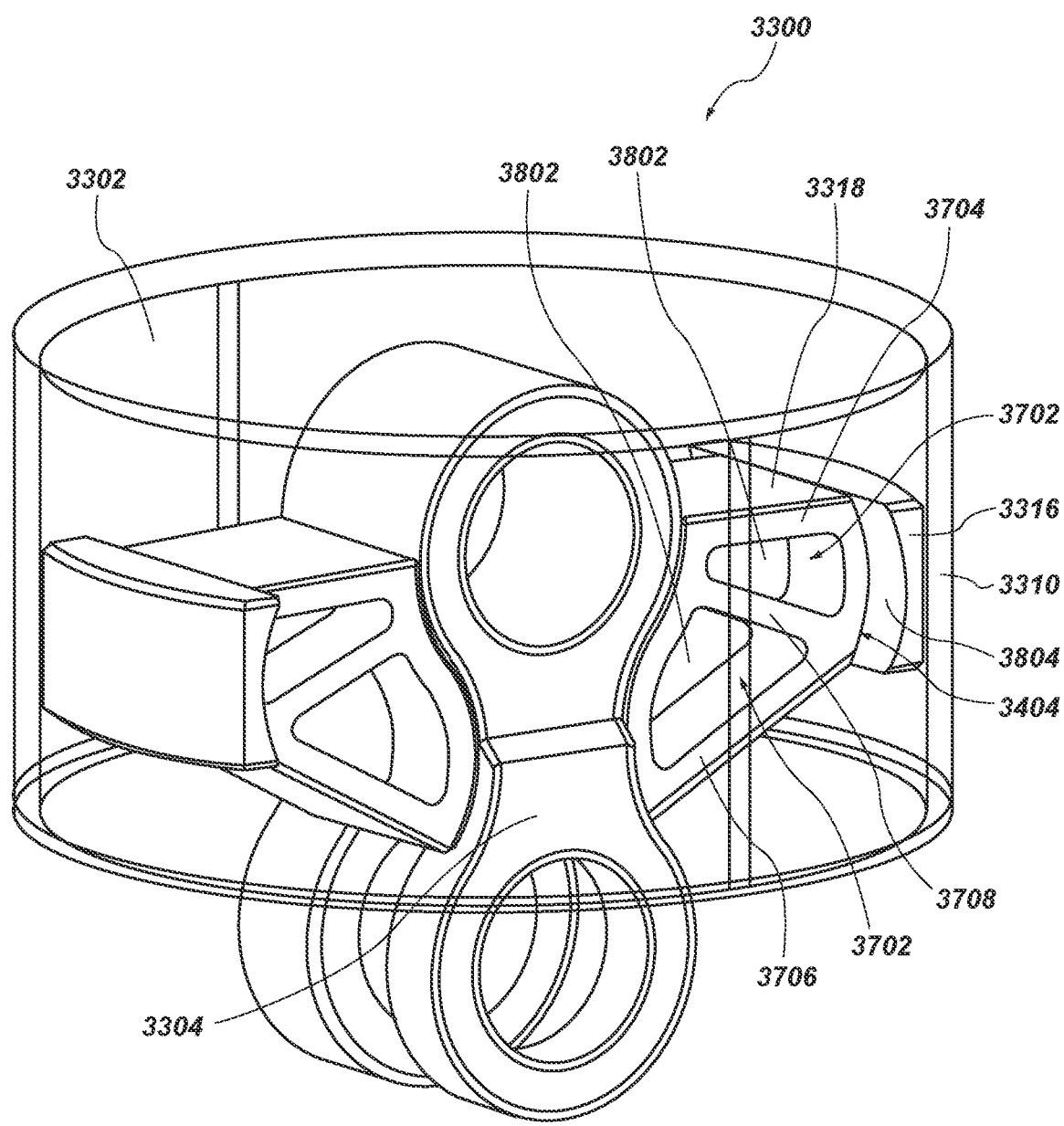

FIG. 38 illustrates a perspective view of the piston assembly 3300. As described above, the struts 3318 may include multiple braces 3704, 3706, 3708 separated by spaces 3702. The spaces 3702 may be recesses, such that the spaces 3702 do not extend completely through the strut 3318. Thus, the strut 3318 may include webbing 3802 within the spaces 3702 forming connections between the multiple braces 3704, 3706, 3708. The webbing 3802 may provide additional support and/or strength to the struts 3318 enabling a more efficient transfer of forces from the rod 3304 to the piston 3302. The additional strength may enable the spaces 3702 to be larger or lighter weight material to be used resulting in a reduction of the weight of the struts 3318 and the piston assembly 3300.

The shoes 3316 may have a contact surface 3804 configured to act as the interface 3404 between the strut 3318 and the shoe 3316. In some embodiments, the contact surface 3804 may be a bearing surface configured to have low friction, such that the forces from the rod 3304 may be transferred from the strut 3318 to the shoe 3316 and then to the piston 3302 with minimal frictional losses due to friction in the interface 3404.

The contact surface 3804 of the shoes 3316 may be greater than a contact surface of the struts 3318. The greater size of the contact surface 3804 of the shoes 3316 may spread the forces transferred from the struts 3318 to the shoes 3316 over a larger area when the forces are transferred from the shoes 3316 to the skirts 3310 of the piston 3302. Spreading the forces over a larger area of the skirts 3310 of the piston 3302 may reduce fatigue, damage, and/or wear of the skirts 3310 due to the transfer of forces from the rod 3304 to the piston 3302 through the support assembly 3314.

Figure 39:
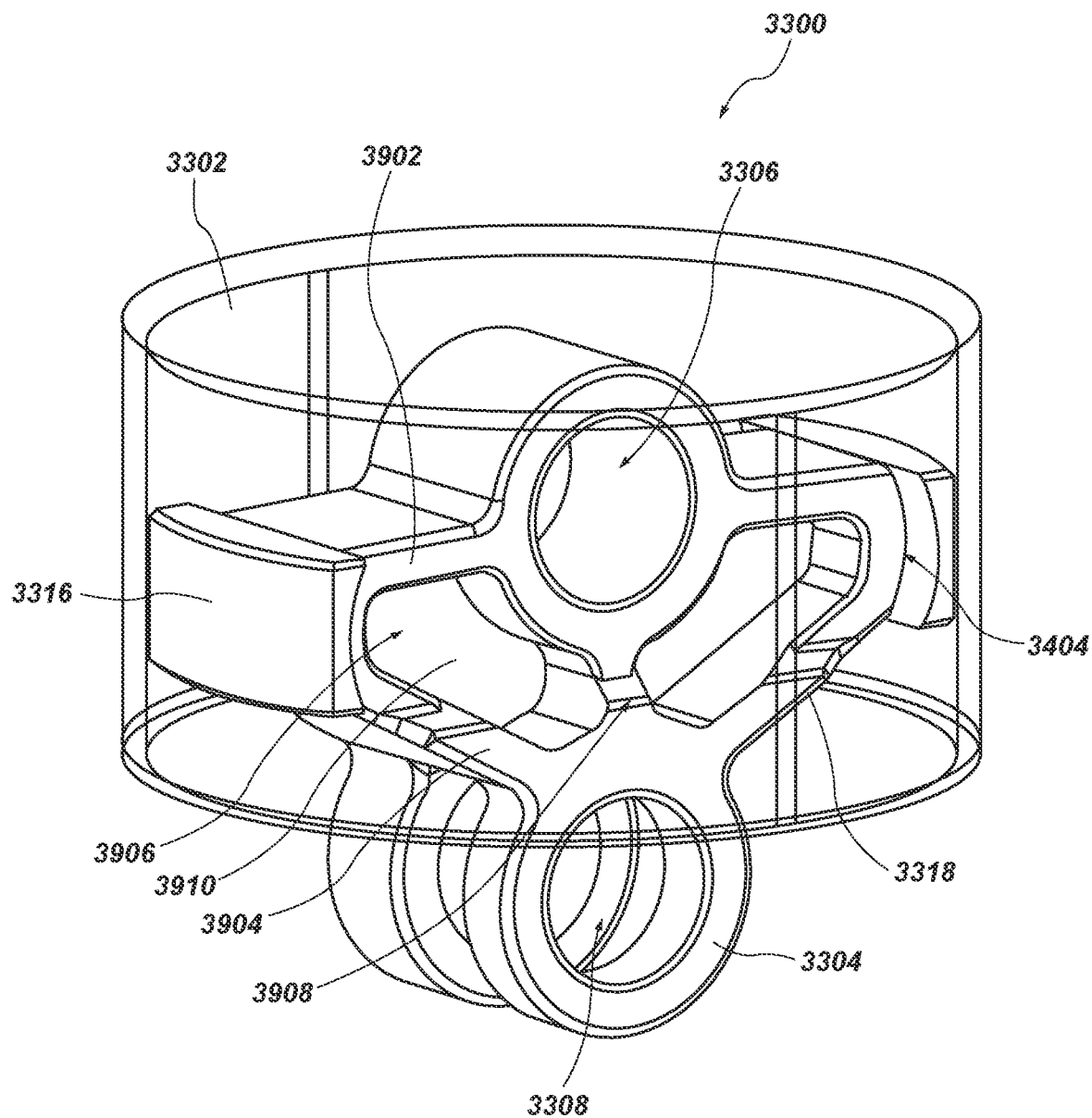

FIG. 39 illustrates a perspective view of the piston assembly 3300. In some embodiments, the struts 3318 may be formed as part of the rod 3304. For example, the rod 3304 may include multiple braces configured to transfer forces to the piston 3302 through the different interfaces described above.

The rod 3304 may include a rod brace 3908 providing structural rigidity between the lower aperture 3308 and the aperture 3306. The rod brace 3908 may be formed along an axis of the rod 3304 extending between a center of the lower aperture 3308 and a center of the aperture 3306. The rod brace 3908 may be configured to transfer forces along the length of the rod 3304 to the piston 3302 through the connection at the aperture 3306. Thus, the rod brace 3908 may be configured to transfer the rod forces 3502 as described in FIG. 35.

The rod 3304 may also include a strut 3318 extending to the shoes 3316. The strut 3318 may be formed from one or more braces. The one or more braces may include a lower brace 3904 and an upper brace 3902. The lower brace 3904 may extend from an area proximate the lower aperture 3308 to an area proximate the interface 3404 between the strut 3318 and the shoe 3316. The one or more braces may also include an upper brace 3902 extending from an area proximate the aperture 3306 to the area proximate the interface 3404 between the strut 3318 and the shoe 3316. The combination of the lower brace 3904 and the upper brace 3902 may be configured to transfer strut forces 3508 (FIG. 35), generated by the movement of the rod 3304 relative to the piston 3302, from the rod 3304 to the piston 3302 through the shoe 3316.

In some embodiments, the braces 3902, 3904, 3908 may be separated by spaces 3906. As described above, the space 3906 may pass completely through the rod 3304 forming apertures separating the braces 3902, 3904, 3908. In other embodiments, the spaces 3906 may be recesses formed in the surface of the rod 3304, such that the braces 3902, 3904, 3908 may remain connected through the spaces 3906 by webbing 3910.

Figure 40:
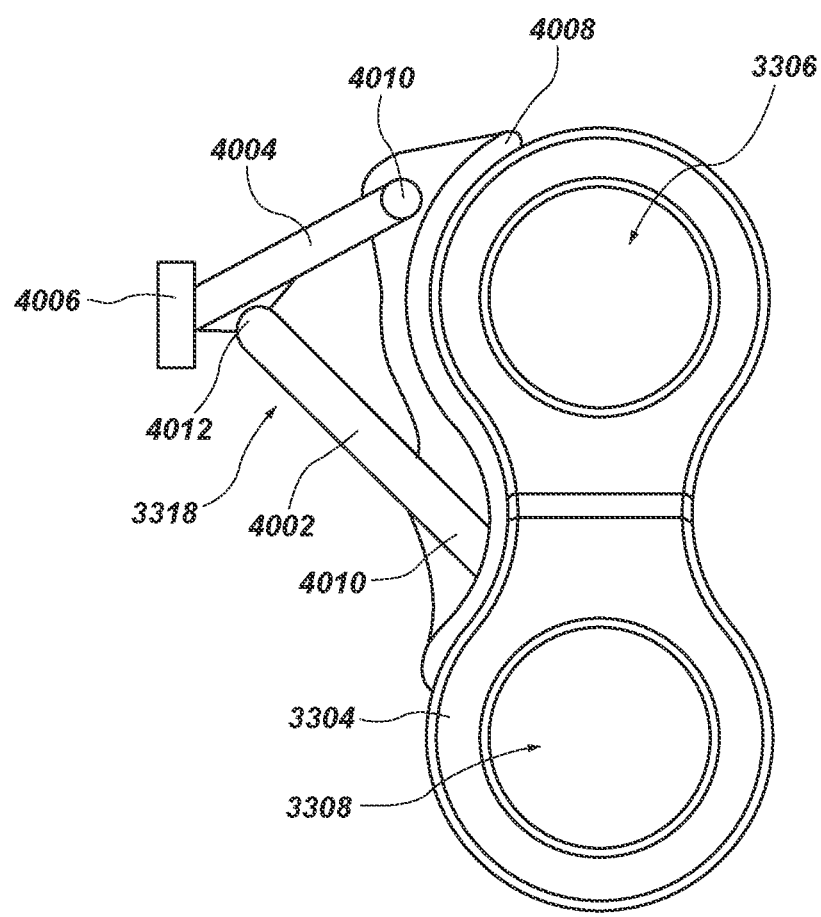
FIG. 40 illustrates a diagrammatic view of a support assembly in accordance with an embodiment of the present disclosure.

FIG. 40 illustrates another embodiment of a strut 3318 coupled to the rod 3304. The strut 3318 may include a lower brace 4002 and an upper brace 4004 coupled to the rod 3304 through a saddle 4008. The saddle 4008 may be configured to provide connections 4010 for the lower brace 4002 and/or the upper brace 4004 to connect to the saddle 4008 and/or the rod 3304. In some embodiments, the saddle 4008 may be formed as part of the rod 3304. In other embodiments, the saddle 4008 may be a distinct part configured to be coupled to the rod 3304, such as through an adhesive, soldering, welding, interference fit, etc.

One or more of the connections 4010 between the lower brace 4002 and the saddle 4008 or between the upper brace 4004 and the saddle 4008 may be a pivot, such as a ball and socket connection, a pinned connection, a hinged connection, etc. The connection 4010 may enable the associated lower brace 4002 or upper brace 4004 to move relative to the rod 3304, such as to absorb impact, to collapse during assembly or disassembly, etc. The upper brace 4004 may include a shoe 4006 configured to transfer force from the strut 3318 to the piston 3302.

In some embodiments, one or more of the lower brace 4002 or the upper brace 4004 may be formed as part of the saddle 4008, such that the associated lower brace 4002 or upper brace 4004 may not move relative to the saddle 4008 and/or rod 3304.

The lower brace 4002 may connect to the upper brace 4004 at a joint 4012. The joint 4012 may be a socket configured to receive an end of the lower brace 4002, such as to form a ball and socket joint. In some embodiments, the joint 4012 may be a recess configured to detain the end of the lower brace 4002, such that the end of the lower brace 4002 may be substantially prevented from moving along the length of the upper brace 4004 after being received in the recess.

The combination of the lower brace 4002 and the upper brace 4004 may be configured to transfer the strut forces 3508 to the piston 3302 through the shoe 4006 in a similar manner to that described above.

The piston assemblies described herein may provide additional advantages over conventional piston assemblies. For instance, in comparison to conventional piston assemblies, the piston assemblies (e.g., piston assembly 100) of the present disclosure may provide more torque lbf·ft (e.g., leverage), which may provide more inertia (lbs) to a crankshaft. For example, the piston assemblies (e.g., piston assembly 100) of the present disclosure may provide about 12% more inertia (lbs) to the crankshaft in comparison to conventional piston assemblies.

Additionally, the piston assemblies (e.g., piston assembly 100) of the present disclosure may translate the piston head 104 at a faster rate and/or change an angle between the lower connecting rod and the crankshaft at a faster rate from top dead center (TDC) during a piston stroke in comparison to conventional piston assemblies. As a result, the piston assemblies of the present disclosure may yield an improved angle at which the piston assembly is rotating the crank at a highest cylinder pressure in comparison to conventional piston assemblies. Accordingly, a resulting power stroke of the piston assemblies of the present disclosure may provide more usable energy.

Moreover, the piston assemblies of the present disclosure translate the piston at a faster rate during portions of a piston stroke in comparison to conventional piston assemblies. As a result, the piston assemblies of the present disclosure may enable ignition to occur more proximate to TDC in comparison to conventional piston assemblies. Enabling ignition to occur more proximate to TDC provides more time for combustion. By providing more time for combustion the mixture of fuel and air may burn more completely during the power stroke such that less unburned fuel and/or harmful emission gasses resulting from partially burned fuel, such as carbon-monoxide (CO), hydrocarbons (HC), and nitrogen oxides (NOx). This may result in cleaner (e.g., better) emissions.

The piston assemblies of the present disclosure also move the piston head at a higher velocity within the piston chamber between 12 o'clock and 3 o'clock (0° and 90°) in comparison to conventional piston assemblies. The higher velocity of the piston head may reduce the amount of time the piston spends at or near top dead center (e.g., dwell time). Combustion that occurs while the piston is at or near top dead center and not moving is substantially converted to waste heat rather than work. As a result, the piston assemblies of the present disclosure provide more effective ignition by moving away from top dead center at a higher rate effectively reducing the amount of waste heat generated by combustion. The reduction in dwell time and waste heat may also reduce an engine's proclivity to detonation (e.g., uncontrolled ignition often resulting from high compression and/or low octane fuels). Therefore, the piston assemblies of the present disclosure may enable engines to operate at higher compression ratios, which may improve engine efficiency and/or power production. The piston assemblies of the present disclosure may also enable engines to be operated with lower octane fuel, enabling higher performance and/or more efficient engines to be operated on less expensive fuel. Furthermore, the piston assemblies of the present disclosure cause the piston head to drop further within the piston chamber from 12 o'clock and 3 o'clock in comparison to conventional piston assemblies. Both of the foregoing behaviors result in the piston assemblies of the present disclosure providing improved volumetric efficiency, improved scavenging, increased negative pressure in the cylinder, and additional air intake (e.g., air volume intake) into the piston chamber (e.g., cylinder) in comparison to conventional piston assemblies. The foregoing behaviors provide increases in energy produced by the piston assemblies in comparison to conventional piston assemblies.

Additionally, the piston assemblies of the present disclosure cause the piston head to move at a slower rate from 6 o'clock position to the 9 o'clock position during an exhaust stroke in comparison to conventional piston assemblies. Moving the piston head at a slower rate from the 6 o'clock position to the 9 o'clock position during an exhaust stroke may reduce heat buildup and an overall engine temperature during operation in comparison to conventional piston assemblies.

Furthermore, the piston assemblies of the present disclosure cause the piston head to move at a faster rate from 9 o'clock position to the 12 o'clock position during an exhaust stroke in comparison to conventional piston assemblies. Moving the piston head at a faster rate from the 9 o'clock position to the 12 o'clock position during an exhaust stroke may create more negative pressure within the piston chamber, which leads to improved scavenging and expelling more exhaust and/or unburned fuel in comparison to conventional piston assemblies. Expelling more exhaust and/or unburned fuel enables more fresh air to be drawn into the piston chamber (e.g., cylinder) subsequently in comparison to conventional piston assemblies.

Moreover, the piston assemblies of the present disclosure may provide more air flow at a lower valve lift, which provides/enables a less abrupt profile on a camp lobe, reduces fatigue, and reduces failure in comparison to conventional piston assemblies.

The piston assemblies of the present disclosure may further enable an intake valve to be open for longer periods of time with less reversion in comparison to conventional piston assemblies. Additionally, the piston assemblies of the present disclosure reduce a dwell time (e.g., a time during which the piston remains (e.g., sits) at top dead center before reversing direction). Moreover, the piston assemblies of the present disclosure may provide improved scavenging during valve overlap in comparison to conventional piston assemblies.

Additionally, the piston assemblies of the present disclosure may provide increased clearance relative to other elements of an engine during the middle portion of each stroke (e.g., the 3 o'clock and 9 o'clock positions). As a result, a rod-to-cylinder wall clearance is improved when increasing the stroke of the engine (e.g., stroking the engine), such as installing a crankshaft with a longer stroke to increase engine displacement.

Furthermore, the piston assemblies of the present disclosure, by utilizing two rods (e.g., the upper rod and the lower rod) and two sets of wrist pins, may reduce impact forces by 50% on individual components. For example, each wrist pin assembly includes small amounts of clearance between the wrist pins and the associated connecting rods, pistons, crankshaft, etc. The small amount of clearance may be filled with oil or another lubricating fluid during engine operation. Impact forces may be transmitted through these clearance areas and the associated lubricating fluid, such that an initial shock, jerk, impact, etc., caused by the impact forces may be absorbed and/or dissipated by the lubricating fluid and clearance in the connection. For instance, the piston assemblies of the present disclosure operate as a shock absorber, and when utilized with the faster angle change at TDC (which reduces the hammer effect), results in less stress being transferred to the crankshaft, bearings, rods (e.g., upper rod and lower rod), and piston head.

Moreover, the piston assemblies of the present disclosure may reduce rocking friction on a piston skirt of the piston head against the inner wall of the piston chamber (e.g., cylinder). Furthermore, the piston assemblies of the present disclosure may function even more efficiently with Turbo Chargers and Super Chargers. For example, the higher velocity of the piston head at or near top dead center may provide more space in the cylinder earlier in the intake stroke enabling a turbo charger or super charger to input a greater amount of air during the intake stroke. Moreover, common problems with turbo charger and super charger applications include an increased amount of heat and detonation often requiring turbocharged and supercharged applications to be operated at lower compression ratios and/or higher octane fuels. The improved heat dissipation reduced amount of dwell time of the piston assemblies of the present disclosure may improve the efficiency of turbo charged and super charged applications.

The present disclosure further includes the following embodiments:

Embodiment 1: A piston assembly, comprising: a piston head for reciprocating within a cylinder of an engine; an upper rod coupled to the piston head at one longitudinal end of the upper rod and fixed relative to the piston head; and a lower rod rotatably coupled to an opposite longitudinal end of the upper rod, the lower rod configured to pivot about the opposite longitudinal end of the upper rod, wherein the lower rod is configured to couple to a crankshaft at a longitudinal end of the lower rod opposite the upper rod.

Embodiment 2: The piston assembly of Embodiment 1, wherein the piston head comprises: a first gusset extending axially from an upper portion of the piston head; and a second gusset extending axially from the upper portion of the piston head, the first and second gussets defining an upper rod receiving aperture.

Embodiment 3: The piston assembly of Embodiments 1 or 2, wherein the upper rod is disposed within the upper rod receiving aperture of the piston head.

Embodiment 4: The piston assembly of any of Embodiments 1 through 3, wherein the upper rod receiving aperture of the piston head is sized and shaped to fix the upper rod relative to the piston head.

Embodiment 5: The piston assembly of any of Embodiments 1 through 4, further comprising a gudgeon pin assembly coupling the upper rod to the piston head.

Embodiment 6: The piston assembly of any of Embodiments 1 through 5, wherein the gudgeon pin assembly comprises two or more circlips, a needle sleeve bearing, and a gudgeon pin.

Embodiment 7: The piston assembly of any of Embodiments 1 through 6, further comprising a connector pin assembly coupling the upper rod to the lower rod.

Embodiment 8: The piston assembly of any of Embodiments 1 through 7, wherein the lower rod comprises a forked portion, the upper rod comprises a connector portion, and the connector pin assembly extends through the forked portion of the lower rod and the connector portion of the upper rod.

Embodiment 9: An engine, comprising: one or more cylinders; a crankshaft; one or more piston assemblies, each piston assembly being disposed within a respective cylinder, each piston assembly comprising: a piston head sized and shaped to reciprocate within the respective cylinder; an upper rod coupled to the piston head at one longitudinal end of the upper rod and fixed relative to the piston head; and a lower rod rotatably coupled to an opposite longitudinal end of the upper rod, the lower rod configured to pivot about the opposite longitudinal end of the upper rod, the lower rod being rotatably coupled to the crankshaft at a longitudinal end of the lower rod opposite the upper rod.

Embodiment 10: The piston assembly of Embodiment 9, wherein the piston head comprises: a first gusset extending axially from an upper portion of the piston head; and a second gusset extending axially from the upper portion of the piston head, the first and second gussets defining an upper rod receiving aperture.

Embodiment 11: The piston assembly of Embodiments 9 or 10, wherein the upper rod is disposed within the upper rod receiving aperture of the piston head.

Embodiment 12: The piston assembly of any of Embodiments 9 through 11, wherein the upper rod receiving aperture of the piston head is sized and shaped to fix the upper rod relative to the piston head.

Embodiment 13: The piston assembly of any of Embodiments 9 through 12, further comprising a gudgeon pin assembly coupling the upper rod to the piston head.

Embodiment 14: The piston assembly of any of Embodiments 9 through 13, wherein the gudgeon pin assembly comprises two or more circlips, a needle sleeve bearing, and a gudgeon pin.

Embodiment 15: The piston assembly of any of Embodiments 9 through 14, further comprising a connector pin assembly coupling the upper rod to the lower rod.

Embodiment 16: The piston assembly of any of Embodiments 9 through 15, wherein the lower rod comprises a forked portion, the upper rod comprises a connector portion, and the connector pin assembly extends through the forked portion of the lower rod and the connector portion of the upper rod.

Embodiment 17: A method of forming a piston assembly, the method comprising: coupling an upper rod to a piston head at a first longitudinal end of the upper rod; fixing a position the upper rod relative to the piston head; rotatably coupling a lower rod to a second longitudinal end of the upper rod; and rotatably coupling the lower to a crankshaft of an engine.

Embodiment 18: The method of Embodiment 17, wherein fixing the position of the upper rod relative to the piston head comprising disposing the upper rod with an upper rod receiving aperture defined by one or more gussets of the piston head.

Embodiment 19: The method of Embodiments 17 or 18, wherein coupling an upper rod to a piston head comprises coupling the upper rod to the piston head with a gudgeon pin assembly.

Embodiment 20: The method of any of Embodiments 17 through 19, wherein rotatably coupling a lower rod to the upper rod comprises coupling the lower rod to the upper rod with a connector pin assembly.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A piston assembly, comprising:
   a piston head for reciprocating within a cylinder, the piston head including a piston skirt;
   a connecting rod coupled to the piston head at a first longitudinal end of the connecting rod; and
   at least two supports extending between the connecting rod and an interior portion of the piston skirt, the at least two supports slidably coupled to the interior portion of the piston skirt on opposing sides of the connecting rod.

2. The piston assembly of claim 1, wherein the at least two supports are slidably coupled to the connecting rod.

3. The piston assembly of claim 1, wherein the at least two supports are configured to induce a lateral force between the at least two supports and the piston skirt.

4. The piston assembly of claim 3, wherein the lateral force is configured to oppose a rod induced lateral force on the piston.

5. The piston assembly of claim 1, wherein the one or more supports include an upper edge having a first length and a lower edge having a second length different from the first length.

6. The piston assembly of claim 5, wherein the second length is greater than the first length.

7. The piston assembly of claim 5, wherein the second length being different from the first length is configured to cause a force between the piston skirt and the at least two supports to increase as the connecting rod rotates relative to the piston.

8. The piston assembly of claim 1, wherein the at least two supports extend between the connecting rod and an interior portion of the piston skirt from a location on the connecting rod between the first longitudinal end of the connecting rod and a second opposite longitudinal end of the connecting rod.

9. The piston assembly of claim 1, wherein the at least two supports include a curved outer surface and the interior portion of the piston skirt includes an interface including a curved inner surface complementary to the curved outer surface of the at least two supports.

10. An engine comprising:
    a cylinder;
    a piston head positioned within the cylinder, the piston head including a piston skirt;
    a connecting rod coupled to the piston head at a first longitudinal end of the connecting rod; and
    at least two supports extending between the connecting rod and an interior portion of the piston skirt, the at least two supports positioned on opposing lateral sides of the connecting rod and configured to transmit lateral forces between the connecting rod and the interior portion of the piston skirt.

11. The engine of claim 10, further comprising a lower connecting rod rotatably coupled between the connecting rod and a crankshaft.

12. The engine of claim 10, wherein the at least two supports are slidably coupled to the interior portion of the piston skirt.

13. The engine of claim 10, wherein the at least two supports are slidably coupled to the connecting rod.

14. The engine of claim 10, wherein the at least two supports extending between the connecting rod and the interior portion of the piston skirt from a position along the connecting rod between the first longitudinal end and a second longitudinal end opposite the first longitudinal end.

15. The engine of claim 10, wherein the at least two supports are configured to cause a force between the piston skirt and the at least two supports to increase as the connecting rod rotates relative to the piston.

16. A method of moving a piston in a cylinder, the method comprising:
   applying an upward force to a central portion of a piston through a connecting rod, the upward force including a first lateral force and a first vertical force;
   generating a first moment on the piston through the first lateral force;
   transferring a support force from a first support extending from the connecting rod to a piston skirt, the support force including a second lateral force and a second vertical force, the second lateral force being directed in a direction opposite the first lateral force, wherein transferring the support force from the first support to the piston skirt comprises, transferring the support force to the piston skirt through slidable contact between the first support and an interior portion of the piston skirt;
   generating a second moment on the piston through the second lateral force, the second moment having a magnitude substantially similar to a magnitude of the first moment and a direction opposite the first moment;
   applying a downward force to the connecting rod through the piston, the downward force including a third lateral force and a third vertical force;
   generating a third moment on the piston through the third lateral force;
   transferring a second support force from a second support extending, in an opposite direction from the first support, from the connecting rod to the piston skirt, the second support force including a fourth lateral force and a fourth vertical force, the fourth lateral force being directed in a direction opposite the third lateral force, wherein transferring the second support force from the second support to the piston skirt comprises, transferring the second support force to the piston skirt through slidable contact between the second support and the interior portion of the piston skirt; and
   generating a fourth moment on the piston through the fourth lateral force, the fourth moment having a magnitude substantially similar to a magnitude of the third moment and a direction opposite the third moment.

17. The method of claim 16, further comprising rotating the connecting rod relative to the piston about the central portion of the piston.

18. The method of claim 17, further comprising increasing at least one of the second lateral force and the second vertical force of the support force as the connecting rod rotates relative to the piston until the support force substantially stops a rotation of the connecting rod.

19. The method of claim 16, wherein transferring the support force from the support to the piston skirt comprises, transferring the support force to the piston skirt through slidable contact between the support and the connecting rod.

* * * * *